United States Patent
Hasegawa et al.

(10) Patent No.: US 7,005,201 B2
(45) Date of Patent: Feb. 28, 2006

(54) MAGNETIC DETECTING ELEMENT

(75) Inventors: Naoya Hasegawa, Niigata-ken (JP); Eiji Umetsu, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 50 days.

(21) Appl. No.: 10/655,939

(22) Filed: Sep. 5, 2003

(65) Prior Publication Data

US 2004/0072021 A1    Apr. 15, 2004

(30) Foreign Application Priority Data

Sep. 27, 2002  (JP) .............................. 2002-282211

(51) Int. Cl.
*G11B 5/127* (2006.01)
*G11B 5/39* (2006.01)

(52) U.S. Cl. ............................. 428/811.5; 428/811.3; 428/816; 360/324.12

(58) Field of Classification Search ............... None
See application file for complete search history.

(56) References Cited

U.S. PATENT DOCUMENTS 6,030,753 A    2/2000    Lin

2001/0028540 A1    10/2001    Sakaguci et al.
2001/0033466 A1    10/2001    Ooshima et al.
2002/0024781 A1    2/2002    Ooshima et al.
2003/0156362 A1 *  8/2003    Gill ....................... 360/324.12
2003/0218836 A1 *  11/2003   Shimazawa et al. ... 360/324.12
2004/0042130 A1 *  3/2004    Lin et al. ............... 360/324.12

FOREIGN PATENT DOCUMENTS

JP    2001-155313    6/2001
JP    2001-339111    12/2001

* cited by examiner

*Primary Examiner*—Kevin M. Bernatz
(74) *Attorney, Agent, or Firm*—Brinks Hofer Gilson & Lione

(57) ABSTRACT

In a magnetic detecting element, second ferromagnetic layers are deposited on respective second antiferromagnetic layers. The magnetization direction of the second ferromagnetic layers is antiparallel to that of first ferromagnetic layers. A static magnetic field generated by a surface magnetic charge at the internal side surfaces of the first ferromagnetic layers is absorbed by the second ferromagnetic layers. Thus, it becomes hard that the static magnetic field from the first ferromagnetic layers enters the central portion of a free magnetic layer. Consequently, the central portion of the free magnetic layer can maintain its single magnetic domain state, and, thus, the hysteresis can be reduced and the Barkhausen noise is suppressed.

15 Claims, 23 Drawing Sheets

MAGNETIC DETECTING ELEMENT

BACKGROUND OF THE INVENTION

1. Field of the Invention

The present invention relates to magnetic detecting elements in which the magnetization of a free magnetic layer is controlled by an exchange bias technique, and particularly to a magnetic detecting element exhibiting a stable, large reproduction output even with a narrow track width and in which side reading can be suppressed, and to a method for manufacturing the same.

2. Description of the Related Art

FIG. 29 is a fragmentary sectional view of a known magnetic detecting element (spin-valve thin-film element), viewed from a side opposing a recording medium.

This magnetic detecting element includes a first antiferromagnetic layer 1 formed of a PtMn alloy or the like, and a pinned magnetic layer 2 formed of a NiFe alloy or the like, a nonmagnetic material layer 3 formed of Cu or the like, a free magnetic layer 4 formed of a NiFe alloy or the like, and a nonmagnetic interlayer 5 formed of Ru or the like are deposited on the first antiferromagnetic layer 1 in that order.

Also, sets of a ferromagnetic layer 6, a second antiferromagnetic layer 7, and an electrode layer 8 are formed on the nonmagnetic interlayer 5, separated by a space having a track width Tw in the track width direction (X direction shown in the figure), as shown in FIG. 29.

Such magnetic detecting elements as shown in FIG. 29 have been disclosed in Japanese Unexamined Patent Application Publication Nos. 2001-155313 (pp. 12–13, FIG. 1) and 2001-339111 (p. 10, FIG. 1).

In the magnetic detecting element shown in FIG. 29, the magnetization of the ferromagnetic layer 6 is fixed in the X direction by an exchange coupling magnetic field generated at the interface between the second antiferromagnetic layer 7 and the ferromagnetic layer 6. The magnetization of the free magnetic layer 4 is fixed in the X direction by RKKY interaction acting between the ferromagnetic layers 6 and the free magnetic layer 4 separated by the nonmagnetic interlayer 5, in both end portions of the element. The free magnetic layer 4 in the central portion of the element is put into a single magnetic domain state to such a small extent that the magnetization thereof is reversible in response to an external magnetic field.

This technique for controlling the magnetization of the free magnetic layer 4 is referred to as the exchange bias method. In particular, in the magnetic detecting element shown in FIG. 29, the free magnetic layer 4 and the ferromagnetic layer 6 are put into an artificial ferromagnetic state. It has therefore been considered that the magnetization of the free magnetic layer 4 is certainly fixed in the end portions of the element to maintain its single magnetic domain state.

Accordingly, it has been expected that the structure shown in FIG. 29 would reduce hysteresis and Barkhausen noise.

However, since, in the magnetic detecting element shown in FIG. 29, the ferromagnetic layers 6 have internal side surfaces 6a, magnetic charge occurs at the internal side surfaces 6a and this surface magnetic charge generates a static magnetic field.

The direction of the static magnetic field is designated by arrows in FIG. 29. Specifically, the static magnetic field is oriented in the inverse direction to the magnetization direction of the free magnetic layer 4 and, consequently, the magnetization of the free magnetic layer 4 is disordered.

Consequently, the hysteresis cannot be reduced even though the ferromagnetic layers 6 are provided as shown in FIG. 29, and possibility of the occurrence of Barkhausen noise is maintained. Further improvement has been desired.

SUMMARY OF THE INVENTION

Accordingly, an object of the present invention is to provide a magnetic detecting element in which a stable single magnetic domain state of the free magnetic layer is maintained to reduce the hysteresis and to make it hard to generate Barkhausen nose.

According to an aspect of the present invention, a magnetic detecting element is provided which includes a multilayer laminate including a first antiferromagnetic layer, a pinned magnetic layer, a nonmagnetic material layer, and a free magnetic layer deposited in that order from below and electrode layers. The magnetic detecting element also includes a nonmagnetic interlayer deposited on the free magnetic layer and a pair of first ferromagnetic layers on the nonmagnetic interlayer in end portions in the track width direction of the magnetic detecting element. The first ferromagnetic layers are separated in a track width direction by a space therebetween. A pair of second antiferromagnetic layers are separately deposited on the respective first ferromagnetic layers, and a pair of second ferromagnetic layers separately deposited on the respective second antiferromagnetic layers. The magnetization direction of the second ferromagnetic layers is antiparallel to that of the first ferromagnetic layers.

The magnetic detecting element of the present invention has, in the end portions of the element, so-called artificial ferrimagnetic structures in which the free magnetic layer and the first ferromagnetic layers are magnetically coupled with the nonmagnetic interlayer therebetween so that the magnetization directions thereof are antiparallel to each other.

The magnetization of the first ferromagnetic layers is fixed by an exchange coupling magnetic field between the first ferromagnetic layers and the second antiferromagnetic layers. In addition, the magnetization of end portions in the track width direction of the free magnetic layer is certainly fixed by the artificial ferrimagnetic structures in the end portions of the element.

Thus, side reading, in which the magnetization of the free magnetic layer in the end portions of the element is changed by an external magnetic field, can be prevented.

In addition, even if a static magnetic field is generated by magnetic charge at internal side surfaces of the first ferromagnetic layers, it is absorbed by the second ferromagnetic layers, because the magnetization direction of the second ferromagnetic layers is antiparallel to the magnetization direction of the first ferromagnetic layers.

Thus, it becomes hard that the static magnetic field from the first ferromagnetic layers enters the central portion of the free magnetic layer. As a result, the central portion of the free magnetic layer maintains a stable single magnetic domain state thereof to reduce the hysteresis and suppress the occurrence of Barkhausen noises.

Preferably, the distance in the track width direction between the second antiferromagnetic layers is larger than the distance in the track width direction between the first ferromagnetic layers so that the first ferromagnetic layers jut out under the respective internal side surfaces in the track width direction of the second antiferromagnetic layers, toward the center in the track width direction of the magnetic detecting element, and the electrode layers lie over the second antiferromagnetic layers and the jutting portions of the first ferromagnetic layers.

As described above, the magnetization of the end portions of the free magnetic layer is fixed by the RKKY interaction between the first free magnetic layer and the first ferromagnetic layers with the nonmagnetic interlayer therebetween, and the central portion of the free magnetic layer is put into a single magnetic domain state by exchange interaction inside the free magnetic layer. The bias magnetic field placed on the central portion of the free magnetic layer acts harder at the boundaries with the end portions. As the track width Tw decreases, the bias magnetic field becomes apt to act harder on the entire central portion of the free magnetic layer.

In general, while the central portion of a free magnetic layer subjected to a hard bias magnetic field is not fixed as firmly as the end portions, it becomes hard to reverse the magnetization thereof in response to external magnetic fields. The region subjected to a bias magnetic field becomes insensitive, and, consequently, reproduction output decreases disadvantageously as the track width is reduced.

In the magnetic detecting element of the present invention, however, the insensitive region of the central portion can be reduced to enhance the reproduction output because the distance in the track width direction between the second antiferromagnetic layers is increased to be larger than the track width Tw, which is determined by the distance between the first ferromagnetic layers.

The first ferromagnetic layers jut out under the respective internal side surfaces in the track width direction of the second antiferromagnetic layers, toward the center in the track width direction of the magnetic detecting element.

The jutting portions of the first ferromagnetic layers constitute artificial ferrimagnetic structures with the underlying nonmagnetic interlayer and free magnetic layer, and an exchange coupling occurs between the first ferromagnetic layers and the free magnetic layer by RKKY interaction. As a result, these regions become more insensitive to external magnetic fields effectively, and the magnetization of these regions becomes hard to reverse effectively by a magnetic field. Thus, the increase of the effective reproduction track width can be prevented and the occurrence of side reading can be suppressed.

Since the electrode layers are provided over the second antiferromagnetic layers and the jutting portions of the first ferromagnetic layers, sense current from the electrode layers can flow into the free magnetic layer and the central portion of the element underlying the free magnetic layer at a minimum distance, without diverging into portions of the multilayer laminate underlying the second antiferromagnetic layers or first ferromagnetic layers of the multilayer laminate.

Preferably, the second ferromagnetic layers are provided over the second antiferromagnetic layers and the jutting portions of the first antiferromagnetic layers. By providing the second ferromagnetic layers over the jutting portions of the first ferromagnetic layers, the distance in the thickness direction between the second ferromagnetic layers and the first ferromagnetic layer is reduced to strengthen the magnetostatic coupling between the second ferromagnetic layers and the first ferromagnetic layers. Accordingly, a static magnetic field generated from the first ferromagnetic layers is prevented from entering the free magnetic layer effectively. The second antiferromagnetic layers over the jutting portions of the first ferromagnetic layers do not necessarily lie directly on the jutting portions.

The second ferromagnetic layers may overlie only the second antiferromagnetic layers. In this structure, also, a magnetostatic coupling can be generated between the second ferromagnetic layers and the first ferromagnetic layers. Even this structure can therefore prevent a static magnetic field generated from the first ferromagnetic layers from entering the free magnetic layer.

The second ferromagnetic layers may comprise a soft magnetic material and be deposited directly on the upper surfaces of the second antiferromagnetic layers.

In this structure, an exchange coupling magnetic field occurs at the interface between the second ferromagnetic layers and the second antiferromagnetic layers, thereby orienting the magnetization of the second ferromagnetic layers antiparallel to the magnetization direction of the first ferromagnetic layers. Specifically, magnetizations of both the first ferromagnetic layers and the second ferromagnetic layers are fixed by exchange coupling magnetic fields between the second antiferromagnetic layer and the first and second ferromagnetic layers, and the fixed magnetizations are antiparallel to each other.

In the structure in which the first ferromagnetic layers underlie the second antiferromagnetic layers and the second ferromagnetic layers overlie the second antiferromagnetic layers, the magnetic moment per area of the free magnetic layer 2 must be larger than that of the first ferromagnetic layers in order to fix the magnetizations of the first ferromagnetic layers and the second ferromagnetic layers antiparallel to each other.

By forming the first ferromagnetic layers and the free magnetic layer of materials having substantially the same composition or substantially the same saturation magnetization Ms, and by setting the thickness of the free magnetic layer larger than that of the first ferromagnetic layers, the magnetic moment per area of the free magnetic layer becomes larger than that of the first ferromagnetic layers.

Alternatively, nonmagnetic layers are provided between the respective second antiferromagnetic layers and the second ferromagnetic layers, and the second ferromagnetic layers comprise a hard magnetic material.

Alternatively, the second ferromagnetic layers may comprise a soft magnetic material. In this instance, the magnetic detecting element further includes nonmagnetic layers between the respective second antiferromagnetic layers and the second ferromagnetic layers, and third antiferromagnetic layers on the respective upper surfaces of the second ferromagnetic layers.

In this structure, an exchange coupling magnetic field occurs at the interface between the second ferromagnetic layers and the third antiferromagnetic layers, thereby orienting the magnetization of the second ferromagnetic layers antiparallel to the magnetization direction of the first ferromagnetic layers.

The first antiferromagnetic layers, the second antiferromagnetic layers, and the third antiferromagnetic layers may comprise the same material. Even in this structure, the magnetization of the pinned magnetic layer crosses the magnetization of the free magnetic layer, the magnetization of the free magnetic layer is oriented antiparallel to the magnetization of the first ferromagnetic layers, and the magnetization of the first ferromagnetic layers is oriented antiparallel to the magnetization of the second ferromagnetic layers.

Alternatively, the third antiferromagnetic layer may comprise a material having a blocking temperature lower than that of the materials of the first antiferromagnetic layers and the second antiferromagnetic layers.

If the second ferromagnetic layers are formed of a hard magnetic material, or if the magnetization of the second ferromagnetic layers is fixed by an exchange coupling magnetic field with the third antiferromagnetic layers, the magnetic moment per area of the free magnetic layer may be larger or smaller than that of the first ferromagnetic layers.

The second antiferromagnetic layers may jut out from the lower edges of the internal side surfaces thereof onto the respective jutting portions of the first ferromagnetic layers with the thickness thereof reduced. Preferably, the thickness of the jutting portion is so small as not to exhibit nonmagnetic characteristics. The thickness is preferably 50 Å or less, and more preferably 30 Å or less.

The electrode layers may be provided above and under the multilayer laminate. This structure is referred to as the current-perpendicular-to-plane (CPP) type.

A method for manufacturing a magnetic detecting element of the present invention includes the following steps:

(a) forming a multilayer laminate so that the magnetic moment per area of a free magnetic becomes larger than that of a first ferromagnetic layer, by depositing a first antiferromagnetic layer, a pinned magnetic layer, a nonmagnetic material layer, a free magnetic layer, a nonmagnetic interlayer, and the first ferromagnetic layer, in that order from below;

(b) performing a first annealing in a magnetic field to generate an exchange magnetic coupling magnetic field at the interface between the first antiferromagnetic layer and the pinned magnetic layer;

(c) depositing a second antiferromagnetic layer and a second ferromagnetic layer on the upper surfaces of both end portions in the track width direction of the multilayer laminate;

(d) performing a second annealing in a magnetic field in a direction crossing the direction of the magnetic field in the first annealing to generate an exchange coupling magnetic field at the interface between the second antiferromagnetic layer and the first ferromagnetic layer; and (e) forming an electrode layer.

In the method of the present invention, the multilayer laminate is formed so that the magnetic moment per area of the free magnetic layer becomes larger than that of the first ferromagnetic layer, in step (a).

Consequently, the magnetization direction of the first ferromagnetic layer is fixed antiparallel to the magnetization direction of the second ferromagnetic layer by the second magnetic field annealing in step (d).

The second ferromagnetic layer may be formed of a soft magnetic material directly on the supper surface of the second antiferromagnetic layer, in step (c).

Thus, an exchange coupling magnetic field occurs at the interface between the second ferromagnetic layer and the second antiferromagnetic layer, thereby orienting the magnetization of the second ferromagnetic layer antiparallel to the magnetization direction of the first ferromagnetic layer. Specifically, magnetizations of both the first ferromagnetic layer and the second ferromagnetic layer are fixed by exchange coupling magnetic fields between the second antiferromagnetic layer and the first and second ferromagnetic layers, and the fixed magnetizations are antiparallel to each other.

A nonmagnetic layer may be provided on the second antiferromagnetic layer and the second ferromagnetic layer may be formed of a hard magnetic material, in step (c). Preferably, the second ferromagnetic layer formed of the hard magnetic material is magnetized in a magnetic field antiparallel to the magnetization direction of the first ferromagnetic layer, after step (d).

Alternatively, in step (c), after providing a nonmagnetic layer on the second antiferromagnetic layer and the second ferromagnetic layer formed of a soft magnetic material on the nonmagnetic layer, a third antiferromagnetic layer may be deposited on the second ferromagnetic layer.

Thus, an exchange coupling magnetic field occurs at the interface between the second ferromagnetic layer and the third antiferromagnetic layer, thereby orienting the magnetization of the second ferromagnetic layer antiparallel to the magnetization direction of the first ferromagnetic layer.

The first antiferromagnetic layer, the second antiferromagnetic layer, and the third antiferromagnetic layer may be formed of the same material if the temperatures and intensities of the magnetic fields in the first annealing and the second annealing are suitably set. Even in this instance, the magnetization of the free magnetic layer can be oriented in a direction crossing the magnetization of the pinned magnetic layer, and the magnetizations of the first ferromagnetic layer and the second ferromagnetic layer can be oriented antiparallel to each other.

The third antiferromagnetic layer may be formed of a material having a blocking temperature lower than that of the materials of the first antiferromagnetic layer and the second antiferromagnetic layer. In this instance, if the temperatures and intensities of the magnetic fields in the first annealing and the second annealing are suitably set, the magnetization of the free magnetic layer can be oriented in a direction crossing the magnetization of the pinned magnetic layer, and the magnetizations of the free magnetic layer and the first ferromagnetic layer can be oriented antiparallel to each other and the magnetizations of the first ferromagnetic layer and the second ferromagnetic layer antiparallel to each other.

Preferably, in step (e), the electrode layer is provided over the multilayer laminate and the second antiferromagnetic layer or third antiferromagnetic layer, and mask layers are provided on the electrode layer. The mask layers have a space therebetween with a distance in the track width direction smaller than that of the space in the second antiferromagnetic layer. Then, the region not covered with the mask layers of the electrode layer is removed to expose the first ferromagnetic layer. In this instance, the method may further include step (f) of removing the exposed portion of the first ferromagnetic layer so that the first ferromagnetic layer lies on the end portions of the free magnetic layer with the nonmagnetic interlayer therebetween, with the internal end portions thereof jutting out toward the center in the track width direction of the element under the internal end portions of the second antiferromagnetic layer. The electrode layer is left over the second antiferromagnetic layer and the jutting portions of the first ferromagnetic layer.

By performing steps (e) and (f), the length in the track width direction of the space dividing the second antiferromagnetic layer is allowed to be larger than the track width Tw, which is determined by the length in the track width direction of the space dividing the first ferromagnetic layer. Also, the electrode layer is provided so as to spread over the jutting portions of the first ferromagnetic layer. Furthermore, the artificial ferrimagnetic structures can easily be formed in which the first ferromagnetic layer lies only on the end portions, but not on the central portion, of the free magnetic layer with the nonmagnetic interlayer therebetween.

In step (e), the electrode layer may be provided above and below the multilayer laminate to manufacture a CPP magnetic detecting element.

DESCRIPTION OF THE PREFERRED EMBODIMENTS

Figure 1:
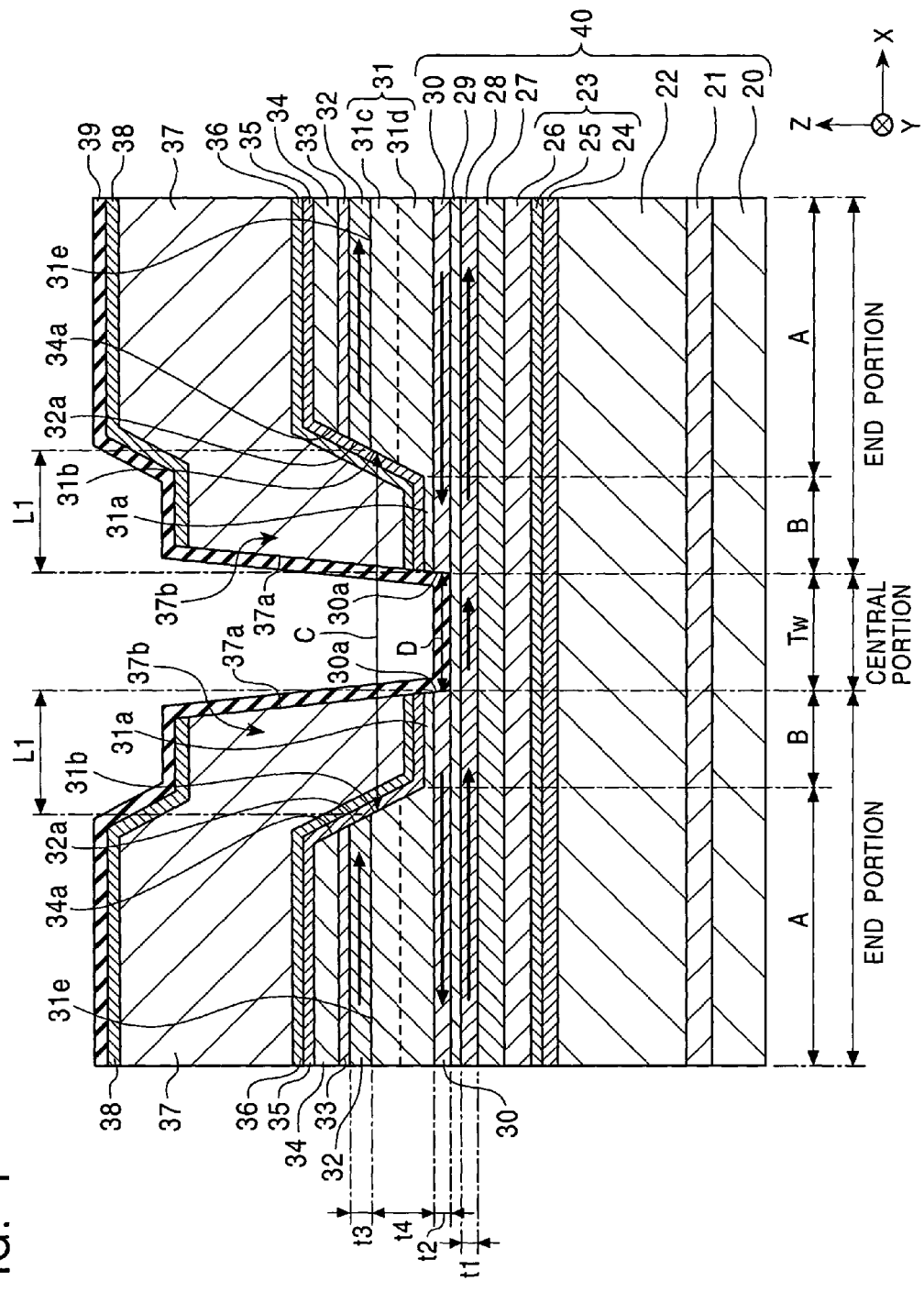
FIG. 1 is a fragmentary sectional view of a magnetic detecting element according to a first embodiment of the present invention, viewed from a side opposing a recording medium.

FIG. 1 is a fragmentary sectional view of a magnetic detecting element according to the present invention, viewed from a side opposing a recording medium.

The magnetic detecting element includes a seed layer 21 formed of a NiFe alloy, a NiFeCr alloy, Cr, or the like on a substrate 20. Specifically, the seed layer 21 is formed of, for example, $(Ni_{0.8}Fe_{0.2})_{60}Cr_{40}$, on a percent basis, to a thickness of 60 Å.

A first antiferromagnetic layer 22 is formed on the seed layer 21. The first antiferromagnetic layer 22 is formed of a PtMn alloy, an X—Mn alloy, or a Pt—Mn—X' alloy, wherein X is at least one element selected from the group consisting of Pd, Ir, Rh, Ru, Os, Ni, and Fe and X' is at least one element selected from the group consisting of Pd, Ir, Rh, Ru, Au, Ag, Os, Cr, Ni, Ar, Ne, Xe, and Kr.

By using these alloys as the first antiferromagnetic layer 22 and subjecting the alloys to heat treatment, the resulting first antiferromagnetic layer 22 and a pinned magnetic layer 23 can form an exchange coupling film that generates a large exchange coupling magnetic field. In particular, by using a PtMn alloy, the first antiferromagnetic layer 22 and the pinned magnetic layer 23 form an excellent exchange coupling film exhibiting an exchange coupling magnetic field of 48 kA/m or more, for example, more than 64 kA/m, and an extremely high blocking temperature of 380° C., at which the exchange coupling magnetic field disappears.

Although these alloys have a disordered face-centered cubic (fcc) structure immediately after being deposited, it is transformed into a CuAuI-type ordered face-centered tetragonal (fct) structure by heat treatment.

The thickness of the first antiferromagnetic layer 22 is set in the range of 80 to 300 Å around the center in the track width direction of the element.

The pinned magnetic layer 23 is provided on the first antiferromagnetic layer 22. The pinned magnetic layer 23 has a three-layer artificial ferrimagnetic structure composed of magnetic layers 24 and 26 and a nonmagnetic interlayer 25 between the magnetic layers 24 and 26.

The magnetic layers 24 and 26 are formed of a magnetic material, such as a NiFe alloy, Co, a CoNiFe alloy, a CoFe alloy, or a CoNi alloy. Preferably, the magnetic layers 24 and 26 are formed of the same material.

The nonmagnetic interlayer 25 is formed of a nonmagnetic material, and specifically of one element selected from or an alloy containing at least two elements selected from the group consisting of Ru, Rh, Ir, Cr, Re, and Cu. Ru is particularly preferable.

A nonmagnetic material layer 27 is formed on the pinned magnetic layer 23. The nonmagnetic material layer 27 prevents magnetic coupling of the pinned magnetic layer 23 with a free magnetic layer 28 and through which sense current flows mainly. Preferably, the nonmagnetic material layer 27 is formed of a conductive nonmagnetic material, such as Cu, Cr, Au, or Ag. Cu is particularly preferable.

The free magnetic layer 28 lies on the nonmagnetic material layer 27. In the embodiment shown in FIG. 1, the free magnetic layer 28 is covered with a nonmagnetic interlayer 29. The free magnetic layer 28 is formed of a magnetic material, such as a NiFe alloy, a CoFe alloy, a CoFeNi alloy, or Co. An anti-diffusion layer (not shown in the figure) formed of Co, CoFe, or the like may be provided between the free magnetic layer 28 and the nonmagnetic material layer 27.

First ferromagnetic layers 30 are provided on the free magnetic layer 28 with the nonmagnetic interlayer 29 therebetween, in both end portions of the element. Preferably, the first ferromagnetic layers 30 are formed of the same magnetic material as in the free magnetic layer 28, such as a NiFe alloy, a CoFe alloy, a CoFeNi alloy, or Co.

The layers from the substrate 20 to the first ferromagnetic layers 30 are hereinafter collectively referred to as a multilayer laminate 40.

Second antiferromagnetic layers 31 are formed on the respective first ferromagnetic layers 30. The second antiferromagnetic layers 31 are formed of a PtMn alloy, an X—Mn alloy, or a Pt—Mn—X' alloy, as with the first antiferromagnetic layer 22, wherein X is at least one element selected from the group consisting of Pd, Ir, Rh, Ru, Os, Ni, and Fe, and X' is at least one element selected from the group consisting of Pd. Ir, Rh, Ru, Au, Ag, Os. Cr, Ni, Ar, Ne, Xe, and Kr.

FIG. 1 shows that each second antiferromagnetic layer 31 has an upper sub layer 31c and a lower sub layer 31d separated by a dotted line. This dotted line indicates that the second antiferromagnetic layer 31 is provided by depositing two layers separately, as described later. However, there is no clear boundary line between the upper sub layer 31c and the lower sub layer 31d.

The thickness of the second antiferromagnetic layers 31 is reduced in regions B of the end portions of the element, which is close to the central portion of the element, such that the thickness in regions A, which is distant from the central portion, is larger than that in regions B. The portions in regions B of the second antiferromagnetic layers 31 are hereinafter referred to as internal end portions 31a of the second antiferromagnetic layer 31.

As shown in FIG. 1, the internal side surfaces 31b of the antiferromagnetic layers 31 in regions A incline or bend such that the distance C in the track width direction between the antiferromagnetic layer 31 gradually increases from below upward (in the Z direction shown in the Figure). Soft magnetic second ferromagnetic layers 32 are deposited on the upper surfaces 31e of the second antiferromagnetic layers 31 in regions A. The second ferromagnetic layers 32 are formed of, for example, a CoFe, NiFe, or CoFeNi alloy or Co.

First stopper layers 33 are formed of, for example, Cr on the respective second ferromagnetic layers 32, and first protective layers 34 are formed of, for example, Ta on the respective first stopper layers 33. The internal side surfaces 34a of the first protective layers 34 are flush with the respective internal side surfaces 31b of the second antiferromagnetic layers 31.

Second stopper layers 35 are formed of Cr or the like over the upper surfaces of the first protective layers 34 and internal end portions 31a of the second antiferromagnetic layers 31 through the internal side surfaces 34a and 31b of the first protective layers 34 and second antiferromagnetic layers 31, and second protective layers 36 are formed of Ta or the like on the respective second stopper layers 35.

In the present embodiment, electrode layers 37 are provided on the respective second protective layers 36. The electrode layers 37 are formed of a conductive nonmagnetic material, such as Au, Cr, Rh, Ru, Ta, or W.

Each electrode layer 37 overlies not only the portion in region A of the second antiferromagnetic layer 31, but also the portion in region B of the first antiferromagnetic layer with the internal end portion 31a of the second antiferromagnetic layer 31, the second stopper layer 35, and the second protective layer 36 therebetween.

The internal side surfaces 37a of the electrode layers 37 are flush with the internal side surfaces of the first ferromagnetic layers 30, internal end portions 31a of the second antiferromagnetic layers 31, second stopper layers 35, and second protective layers 36. In the present embodiment, the internal side surfaces 37a of the electrode layers 37 are inclined or bent such that the distance in the track width direction therebetween gradually increases from below upward (in the Z direction). However, the internal side surfaces 37a of the electrode layers 37 may extend in the perpendicular direction to the surface of the substrate 20 (in the Z direction).

The electrode layers 37 are covered with respective third protective layers 38 formed of Ta or the like, and a fourth protective layer 39 is further provided over the surfaces from third protective layers 38 to the nonmagnetic interlayer 29 exposed in a space with a distance D between the first ferromagnetic layers 30 through the internal side surfaces 37a of the electrode layers 37. The fourth protective layer 39 may be formed of an insulating material such as $Al_2O_3$ or $SiO_2$ to serve as, for example, an upper gap layer. Alternatively, the fourth protective layer 39 may be allowed to serve as a specular layer, as described later.

Characteristic features of the magnetic detecting element shown in FIG. 1 will now be described.

In the magnetic detecting element shown in FIG. 1, the first ferromagnetic layers 30 are provided on both end portions of the free magnetic layer 28 with the nonmagnetic interlayer 29 therebetween, and the second antiferromagnetic layers 31 overlie the respective first ferromagnetic layers with a distance C larger than the distance D in the track width direction (X direction) between the first antiferromagnetic layers 30.

Second antiferromagnetic layers 31 have a larger thickness in regions A in the end portions of the element. The magnetization of the first ferromagnetic layers 30 is firmly fixed antiparallel to the track width direction (X direction) by an exchange coupling magnetic field generated between the thick portions of the second antiferromagnetic layers 31 and the first ferromagnetic layers 30 underlying the thick portions. The magnetization of the free magnetic layer 28 in regions A, opposing the first ferromagnetic layers 30 in the thickness direction, is fixed in the reverse direction (track width direction) to the magnetization of the first ferromagnetic layers 30 by RKKY interaction therebetween.

On the other hand, a bias magnetic field mediated by exchange interactions inside the first ferromagnetic layers 30 and free magnetic layer 28 and exchange coupling resulting from the RKKY interaction between the first ferromagnetic layers 30 and the free magnetic layer 28 act on the portions in regions B of the first ferromagnetic layers 30, which jut out toward the central portion under the thick portions of the second antiferromagnetic layers 31, and the portions in regions B of the free magnetic layer 28 opposing the first ferromagnetic layers 30 in the thickness direction (Z direction). Consequently, the sensitivities in regions B of the first ferromagnetic layers 30 and free magnetic layer 28 are reduced, and can be reduced to zero.

The central portion of the element has no first free magnetic layer 30 on the free magnetic layer 28 with the nonmagnetic interlayer 29. The central portion of the free magnetic layer 28 is, therefore, subjected to only the bias magnetic field mediated by the exchange interactions inside the magnetic layers but not subjected to the exchange coupling resulting from the RKKY interaction with the first ferromagnetic layers 30. Consequently, it is put into a single magnetic domain state to such a small extent that their magnetizations are reversible in sensitive response to an external magnetic field.

In addition, even if a static magnetic field is generated by the magnetic charge at the internal side surfaces 30a of the first ferromagnetic layers 30, it is absorbed by the second ferromagnetic layers 32 because the magnetization of the second ferromagnetic layers 32 is antiparallel to the magnetization direction of the first ferromagnetic layers 30.

Thus, it becomes hard that the static magnetic field from the first ferromagnetic layers 30 enters the central portion of the free magnetic layer 28. As a result, the central portion of the free magnetic layer 28 maintains the single magnetic domain state thereof to reduce the hysteresis and suppress the occurrence of Barkhausen noises.

Also, since the internal end portions 37b of the electrode layers 37 overlie the first ferromagnetic layers 30 in regions B with the internal end portions 31a of the second antiferromagnetic layers 31 and other layers therebetween, sense current from the electrode layers 37 does not diverge to the second antiferromagnetic layer 31 in the end portions of the element and the entire multilayer laminate under the first ferromagnetic layers 30, but flows into the free magnetic layer 28 and the central portion of the multilayer laminate under the free magnetic layer 28 from the internal end portion 37b of the electrode layer 37 at a minimum distance.

Other characteristic features of the magnetic detecting element shown in FIG. 1 will be described. First ferromagnetic layers 30 and the end portions of the free magnetic layer 28 constitute artificial ferrimagnetic structures with the nonmagnetic interlayer 29 therebetween. Preferably, the nonmagnetic interlayer 29 is formed of at least one element selected from the group consisting of Ru, Rh, Ir, Cr, Re, Cu.

The first ferromagnetic layers 30 are disposed on the lower surfaces of the second antiferromagnetic layers 31 and the second ferromagnetic layers 32 are disposed on the upper surfaces of the second antiferromagnetic layers 31. In order to fix the magnetizations of the first ferromagnetic layers 30 and the second ferromagnetic layers 32 antiparallel to each other, the magnetic moment per area of the free magnetic layer 28 must be larger than that of the first ferromagnetic layers 30.

In the present embodiment, by forming the free magnetic layer 28 and the first ferromagnetic layer 30 of the same material and setting the thickness t1 of the free magnetic layer 28 to be larger than the thickness t2 of the first ferromagnetic layers 30, the magnetic moment Ms×t1 per area of the free magnetic layer 28 is set to be larger than the magnetic moment Ms×t2 per area of the first ferromagnetic layer 30.

The thickness t3 of the second ferromagnetic layers 32 is preferably in the range of 10 to 200 Å, and more preferably in the range of 20 to 90 Å. An excessively small thickness t3 of the second ferromagnetic layer 32 weakens the static magnetic coupling between the first ferromagnetic layers 30 and the second ferromagnetic layers 32, and, consequently, the single magnetic domain state of the free magnetic layer 28 cannot be suitably stabilized. In contrast, an excessively large thickness t3 of the second ferromagnetic layer 32 makes the magnetic field from the second ferromagnetic layers 32 excessively strong, thereby degrading the sensitivity of the central portion of the free magnetic layer 28. Also, since the exchange coupling magnetic field of the second ferromagnetic layers 32 weakens in inverse proportion to the thickness, an excessively larger thickness t3 of the second ferromagnetic layers 32 makes the magnetization direction of the second ferromagnetic layers 32 unstable, consequently disordering the magnetic domain structure of the free magnetic layer 28, conversely.

In the magnetic detecting element shown in FIG. 1, the internal end portions 31a of the second antiferromagnetic layers 31, which have a thickness smaller than that of the portions in regions A, jut out from the lower edges of the internal side surfaces 31b into regions B. These internal end portions 31a of the second antiferromagnetic layers 31 may not be provided, but are, preferably, provided because it can eliminate negative effects of ion milling on the layers thereunder, performed in a method for manufacturing a magnetic detecting element, described later.

Preferably, the thickness of the internal end portions 31a is 50 Å or less. This is because, if the internal end portions 31a have a thickness of more than 50 Å, they assume an antiferromagnetism to generate an exchange coupling magnetic field between the first ferromagnetic layers 30 and the internal end portions 31a in regions B. Consequently, the magnetizations of the first ferromagnetic layers 30 and the free magnetic layer 28 are firmly fixed in regions B, so that the bias magnetic field transmitted from the and portions of the free magnetic layer 28 by an exchange interaction in the magnetic layers is strengthened around the boundaries between the central portion and the ends portions of the free magnetic layer 28. Thus, the free magnetic layer 28 becomes insensitive in the central portion, consequently, reducing reproduction output.

Preferably, the second antiferromagnetic layers 31 have a thickness t4 in the range of 80 to 300 Å in regions A. Thus, an exchange coupling magnetic field having a suitable intensity is generated between the second antiferromagnetic layers 31 and the first ferromagnetic layers 30 to fix the magnetizations of the first ferromagnetic layers 30 and the free magnetic layers 28 more effectively in regions A.

The magnetic detecting element shown in FIG. 1 has the stopper layers 33 and 35. Preferably, the stopper layers 33 and 35 are formed of at least one element selected from the group consisting of Ta, Cr, V, Nb, Mo, W, Fe, Co, Ni, Pt, and Rh.

The second stopper layers 35 must be conductive and have a lower etching rate than that of the electrode layers 37. The reason for the necessity of conductivity is that sense current flows from the internal end portion 37b of one of the electrode layer 37 to the multilayer laminate 40 through the corresponding second stopper layer 35. The reason for the necessity of an etching rate lower than that of the electrode layers 37 is to eliminate negative effects of etching for dividing a continuous electrode layer into the two electrode layers 37 in a manufacturing method described later, and even of over-etching. Since over-etching exposes only the second stopper layers 35, whose etching rate is low, and the second stopper layers 35 are not entirely removed, the layers under the second stopper layers 35 are not affected by etching.

If the second stopper layers 35 are formed of a material not affected or hardly affected by reactive ion etching (RIE), regions exposed by over-etching the continuous electrode layer 37 of the second stopper layers 35 are hardly affected by RIE. For example, the manufacturing method, described later, includes the step of partially removing the continuous electrode layer 37 from the central portion of the element by RIE. In this instance, a second stopper layer 35 formed of a material not etched by reactive ion etching is not affected by the RIE. Such a material may be used for the second stopper layers 35.

The second stopper layers 35 are covered with the respective Ta second protective layers 36, and these second stopper layers 35 are formed of, for example, Cr. The Cr in the second stopper layers and Au, which is a constituent of the electrode layers 37, are apt to diffuse into each other. This diffusion disadvantageously increases the resistance of the resulting magnetic detecting element. If the electrode layers 37 and the second stopper layers 35 are formed of Au and Cr, respectively, they, preferably, have the Ta second protective layers 36 therebetween in order to prevent the diffusion.

The structure of the central portion of the element will now be described. In the embodiment shown in FIG. 1, the central portion of the free magnetic layer 28 is covered with the nonmagnetic interlayer 29. The nonmagnetic interlayer 29, which is formed of Ru as described above, is intended to form artificial ferrimagnetic structures with the free magnetic layer 28 and the first ferromagnetic layers 30 in the end portions of the element.

The nonmagnetic interlayer 29 is not, therefore, necessarily provided on the free magnetic layer 28 in the central portion, which has no first ferromagnetic layer 30. In such a case, the fourth protective layer 39 may be provided directly on the central portion of the free magnetic layer 28. In this instance, the fourth protective layer 39 may be allowed to serve as a specular layer.

By providing the specular layer, conduction electrons (for example, up-spin conduction electrons) reaching the specular layer are subjected to specular reflection while maintaining their spin states (energy and quantum states). The specular-reflected up-spin conduction electrons change their traveling direction, and pass through the free magnetic layer 28.

By providing the specular layer, it becomes possible to extend the mean free path λ+ of the up-spin conduction electrons and, thus, to increase the difference between the mean free path λ+ of the up-spin conduction electrons and the mean free path λ− of the down-spin conduction electrons. Accordingly, the rate of change in resistance (ΔR/R) and reproduction output can be increased.

The specular layer is formed, for example, by depositing Ta to a thickness of about 10 to 20 Å to form the fourth protective layer 39 and completely oxidizing the Ta layer. Other materials of the specular layer include oxides, such as Fe—O, Ni—O, Co—O, Co—Fe—O, Co—Fe—Ni—O, Al—O, Al—Q—O, and R—O, wherein Q is at least one selected from the group consisting of B, Si, N, Ti, V, Cr, Mn, Fe, Co, and Ni and R is at least one selected from the group consisting of Cu, Ti, V, Cr, Zr, Nb, Mo, Hf, and W; nitrides, such as Al—N, Al—Q'—N, and R'—N, wherein Q' is at least one selected from the group consisting of B, Si, O, Ti, V, Cr, Mn, Fe, Co, and Ni and R' is at least one selected from the group consisting of Ti, V, Cr, Zr, Nb, Mo, Hf, and W; and semimetallic whistler alloys.

The fourth protective layer 39 prevents short circuits between the electrode layers 37 and an upper shield layer (not shown in the figure) at the back in the height direction (Y direction) of the element, and prevents the upper surfaces of the electrode layers 37 from oxidizing.

Although the magnetic detecting element shown in FIG. 1 is of current-in-plane (CIP) type in which sense current flows from the electrode layers 37 substantially parallel to the surfaces of the layers of the multilayer laminate 40, the structure shown in FIG. 1 can also be applied to a current-perpendicular-to-plane (CPP) magnetic detecting element.

Figure 2:
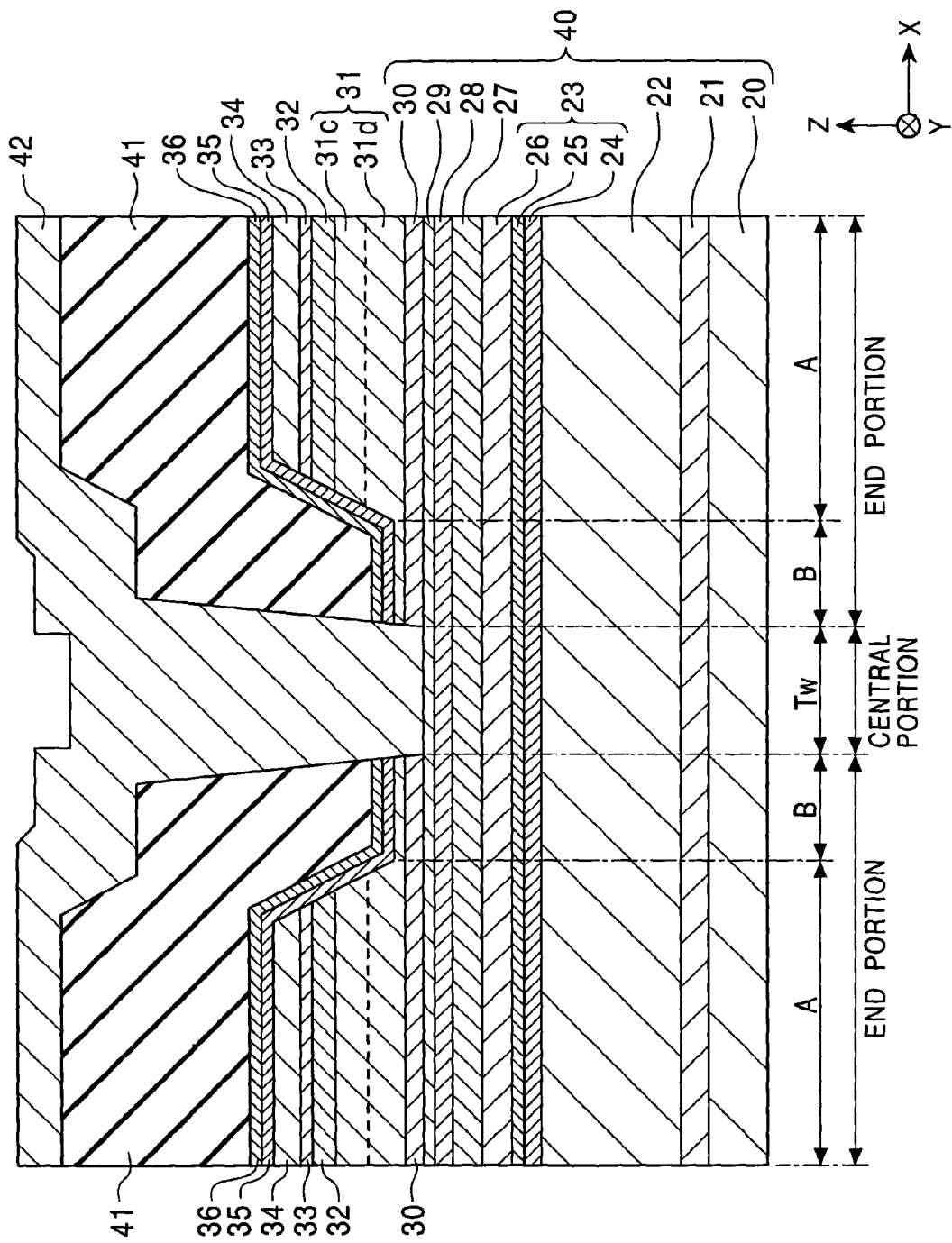
FIG. 2 is a fragmentary sectional view of a magnetic detecting element according to a second embodiment of the present invention, viewed from a side opposing a recording medium.

Such an embodiment is shown in FIG. 2 that is a fragmentary sectional view of a magnetic detecting element according to a second embodiment of the present invention, viewed from a side opposing a recording medium. The same reference numerals as in FIG. 1 designate the same layers as in FIG. 1.

In the magnetic detecting element shown in FIG. 2, the substrate 20 serves as a lower electrode layer, or, for example, a lower shield layer formed of a magnetic material.

The magnetic detecting element has insulating layers 41 formed of an insulating material, such as $Al_2O_3$ or $SiO_2$ in the positions corresponding to the electrode layers 37 in FIG. 1. The fourth protective layer 39 is not provided as in the foregoing embodiment shown in FIG. 1, but an upper electrode layer 42 is formed over the insulating layers 41 and the nonmagnetic interlayer 29 in the central portion of the element. The upper electrode layer 42 is an upper shield layer formed of, for example, a magnetic material.

In the magnetic detecting element shown in FIG. 2, the insulating layers 41 between the second antiferromagnetic layers 31 and the upper electrode layer 42 prevents sense current flowing from the upper electrode layer 42 into the multilayer laminate 40 in the thickness direction from diverging to the second antiferromagnetic layers 31. Consequently, the resulting magnetic detecting element can produce large reproduction output.

If the fourth protective layer 39 is provided on the nonmagnetic interlayer 29 in the central portion of the element, it interferes with or prevents the flow of sense current from the electrode layer to the multilayer laminate 40 in the thickness direction, thereby degrading reproduction characteristics. That is why the fourth protective layer 39 is not formed as in FIG. 1. However, if the fourth protective layer 39 is formed of a conductive nonmagnetic material, it may be provided. In this instance, the fourth protective layer 39 serves as part of an upper gap layer.

The nonmagnetic material layer 27 shown in FIG. 2 is formed of, for example, Cu. However, if the magnetic detecting element is a tunneling magnetoresistive (TMR) element using a spin tunnel effect, the nonmagnetic material layer 27 is formed of an insulating material such as $Al_2O_3$.

Figure 3:
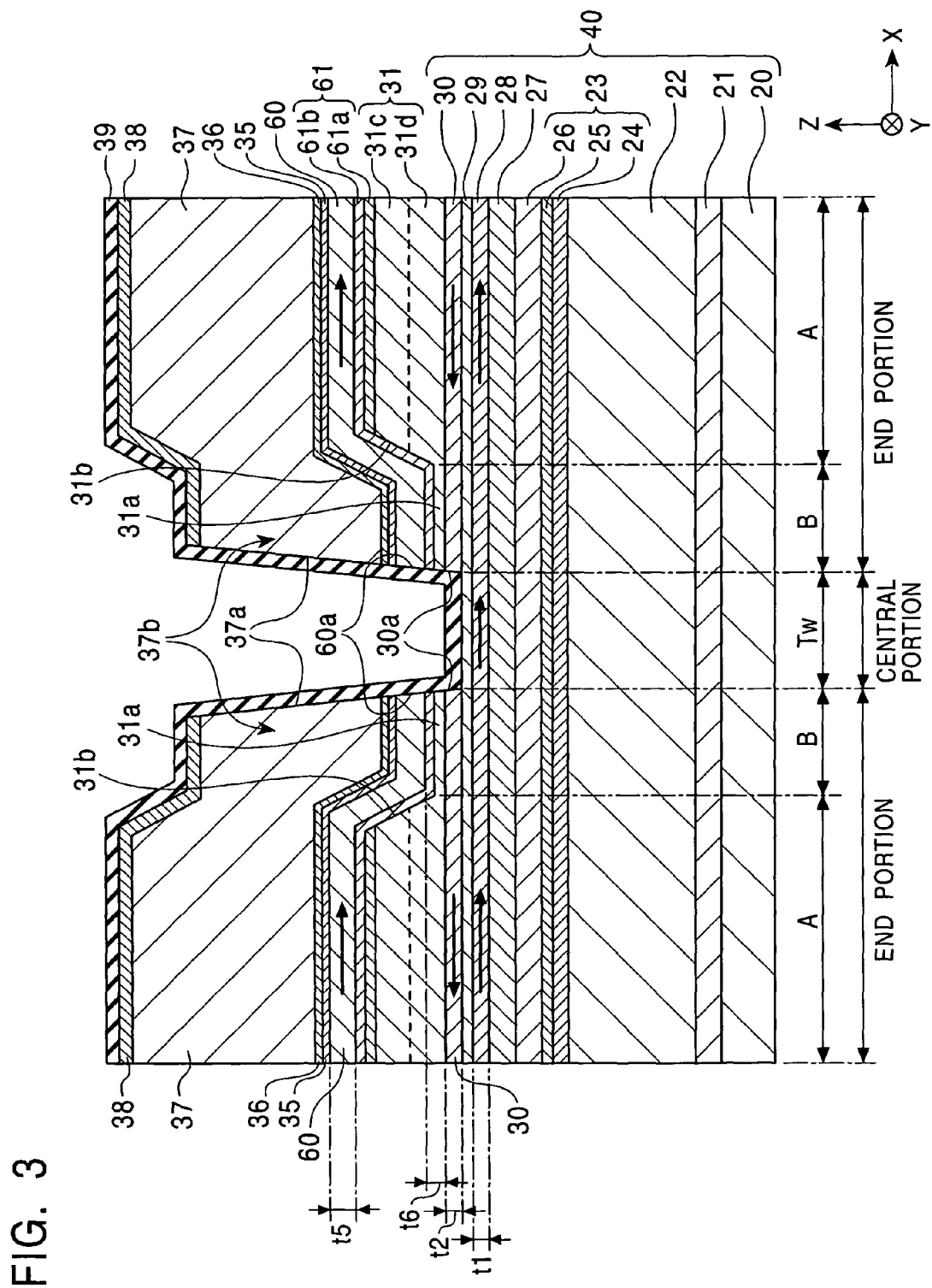
FIG. 3 is a fragmentary sectional view of a magnetic detecting element according to a third embodiment of the present invention, viewed from a side opposing a recording medium.

FIG. 3 is a fragmentary sectional view of a magnetic detecting element according to a third embodiment of the present invention, viewed from a side opposing a recording medium. The same reference numerals as in FIG. 1 designate the same layers as in FIG. 1.

The magnetic detecting element shown in FIG. 3 is different from the magnetic detecting element shown in FIG. 1 in that second ferromagnetic layers 60 are formed of a hard magnetic material on the second antiferromagnetic layers 31 with nonmagnetic layers 61 therebetween.

The nonmagnetic layers 61 each include a Ta layer 61a and a base layer 61b deposited on the Ta layer 61a. Preferably, the base layer 61b is formed of a metal, such as Cr or W, whose crystals have a body-centered cubic structure (bcc structure). The base layer 61b, preferably, has a (100) plane preferential orientation.

However, if the base layers 61b are deposited directly on the second antiferromagnetic layers 31, the crystals of the base layers 61b are preferentially oriented in (110) plane to reduce the coercive force Hc and remanence ratio S of the second ferromagnetic layers 60.

Accordingly, each base layer 61b is provided on the Ta layer 61a so as to be oriented in (100) plane or substantially not oriented.

The second ferromagnetic layers 60 are formed of a hard magnetic material, such as a CoPt alloy or a CoPtCr alloy. These alloys have a hexagonal close-packed structure (hcp) or a combination structure of a face centered cubic structure (fcc) and a hexagonal close-packed structure (hcp).

The orientation in the (100) planes of the base layer 61b makes it difficult to form an fcc structure in the CoPt alloy constituting the second ferromagnetic layers 60, but makes it easy to form a hcp structure. In this instance, the c axis of the hcp structure is preferentially oriented at the interfaces between the CoPt second ferromagnetic layers 60 and the base layers 61b. Since the hcp structure has magnetic anisotropy in the c axis direction, the coercive force Hc is enhanced in the longitudinal direction of layers. In addition, since the c axis of the hcp structure is preferentially oriented at the interfaces between the CoPt second ferromagnetic layers 60 and the base layers 61b, the residual magnetization increases and the remanence ratio S obtained by dividing the residual magnetization by the saturation magnetic flux density increases.

In the magnetic detecting element shown in FIG. 3, even if a static magnetic field is generated by the magnetic charge at the internal side surfaces 30a of the first ferromagnetic layers 30, it is absorbed by the second ferromagnetic layers 60 because the magnetization of the second ferromagnetic layers 60 is antiparallel to the magnetization direction of the first ferromagnetic layers 30, as with the first embodiment.

Thus, it becomes hard that the static magnetic field from the first ferromagnetic layers 30 enters the central portion of the free magnetic layer 28. As a result, the central portion of the free magnetic layer 28 maintains the single magnetic domain state thereof to reduce the hysteresis and suppress the occurrence of Barkhausen noises.

Figure 4:
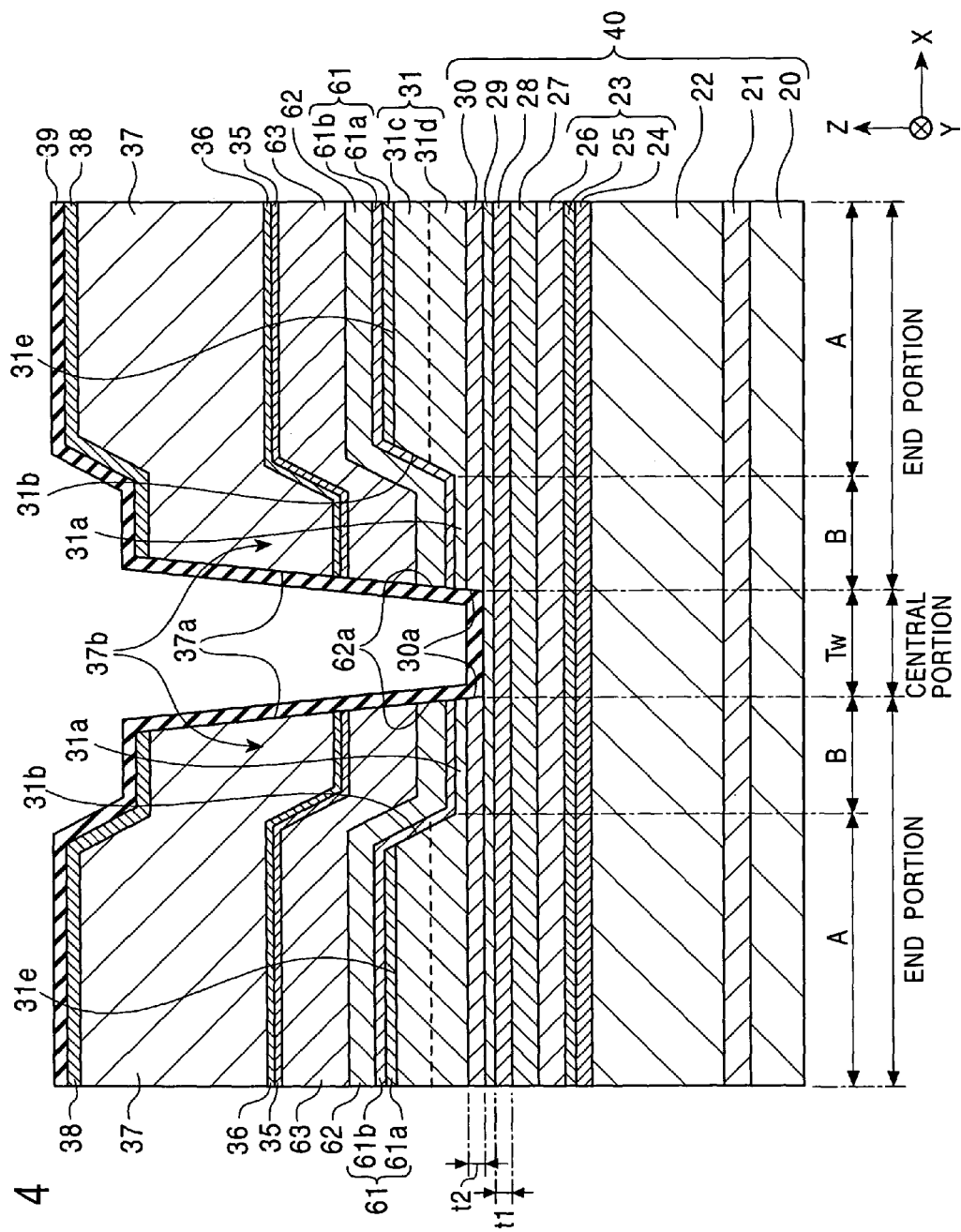
FIG. 4 is a fragmentary sectional view of a magnetic detecting element according to a fourth embodiment of the present invention, viewed from a side opposing a recording medium.

FIG. 4 is a fragmentary sectional view of a magnetic detecting element according to a fourth embodiment of the present invention, viewed from a side opposing a recording medium. The same reference numerals as in FIG. 3 designate the same layers as in FIG. 3.

In the magnetic detecting element shown in FIG. 4, second ferromagnetic layers 62 are formed of a soft magnetic material on the second antiferromagnetic layers 31 with the nonmagnetic layer 61 therebetween. Also, third antiferromagnetic layers 63 are deposited directly on the upper surfaces of the second ferromagnetic layers 62.

In this magnetic detecting element, an exchange coupling magnetic field occurs at the interfaces between the second ferromagnetic layers 62 and the third antiferromagnetic layers 63, thereby orienting the magnetization of the second ferromagnetic layers 62 antiparallel to the magnetization direction of the first ferromagnetic layers 30.

The third antiferromagnetic layers 63 are formed of the same antiferromagnetic material of the first and second antiferromagnetic layers 22 and 31. However, the third antiferromagnetic layers 63 may be formed of an antiferromagnetic material having a blocking temperature lower than that of the material of the first and second antiferromagnetic layers 22 and 31. Exemplary antiferromagnetic materials having a lower blocking temperature include IrMn and FeMn.

In the magnetic detecting element shown in FIG. 4, even if a static magnetic field is generated by the magnetic charge at the internal side surfaces 30a of the first ferromagnetic layers 30, it is absorbed by the second ferromagnetic layers 62 because the magnetization of the second ferromagnetic layers 62 is antiparallel to the magnetization direction of the first ferromagnetic layers 30, as with foregoing embodiments.

Thus, it becomes hard that the static magnetic field from the first ferromagnetic layers 30 enters the central portion of the free magnetic layer 28. As a result, the central portion of the free magnetic layer 28 maintains the single magnetic domain state thereof to reduce the hysteresis and suppress the occurrence of Barkhausen noises.

In the magnetic detecting elements shown in FIGS. 3 and 4, the second ferromagnetic layers 60 or 62 are provided over the second antiferromagnetic layers 31 such as to extend over the portions in regions B of the first ferromagnetic layer 30 jutting out under the respective internal side surfaces 31b of the second antiferromagnetic layers 31, toward the center in the track width direction of the element.

Thus, the internal side surface 60a or 62a of each second ferromagnetic layer 60 or 62 is flush with the internal side surface 30a of the corresponding first ferromagnetic layer 30 and the distance therebetween is reduced.

Consequently, the magnetostatic coupling between the first ferromagnetic layer 30 and the second ferromagnetic layer 60 or 62 is strengthened, thereby making it hard that the static magnetic field enters the central portion of the free magnetic layer 28. As a result, the central portion of the free magnetic layer 28 certainly maintains the single magnetic domain state thereof to further reduce the hysteresis and suppress the occurrence of Barkhausen noises.

However, the internal side surfaces 60a or 62a of the second ferromagnetic layers 60 or 62 are not necessarily flush with the respective internal side surfaces 30a of the first ferromagnetic layers 30, and the internal side surfaces 60a or 62a of the second ferromagnetic layers 60 or 62 may be recessed from the extensions of the internal side surfaces 30a of the first ferromagnetic layers 30. The second ferromagnetic layers 60 or 62 may be provided only on the antiferromagnetic portions in regions A of the second antiferromagnetic layers 31.

Magnetic detecting elements including the second ferromagnetic layers 60 formed of a hard magnetic material or the second ferromagnetic layers 62 whose magnetization is fixed by an exchange coupling magnetic field with the third antiferromagnetic layers 63 allow the magnetizations of the first ferromagnetic layers 30 and the second ferromagnetic layers 60 or 62 to be antiparallel, irrespective of whether the magnetic moment per area of the free magnetic layer 28 is larger or smaller than that of the first ferromagnetic layer 30.

Although the magnetic detecting elements shown in FIGS. 3 and 4 are of CIP type, in which sense current flows substantially parallel to the surfaces of the layers of the multilayer laminate 40, their structures can also be applied to a CPP magnetic detecting element having electrode layers above and under the multilayer laminate 40, as in the magnetic detecting element shown in FIG. 2.

FIGS. 5 to 13 shows process steps for manufacturing the magnetic detecting element shown in FIG. 1, and they are fragmentary sectional views from a side opposing a recording medium.

Figure 5:
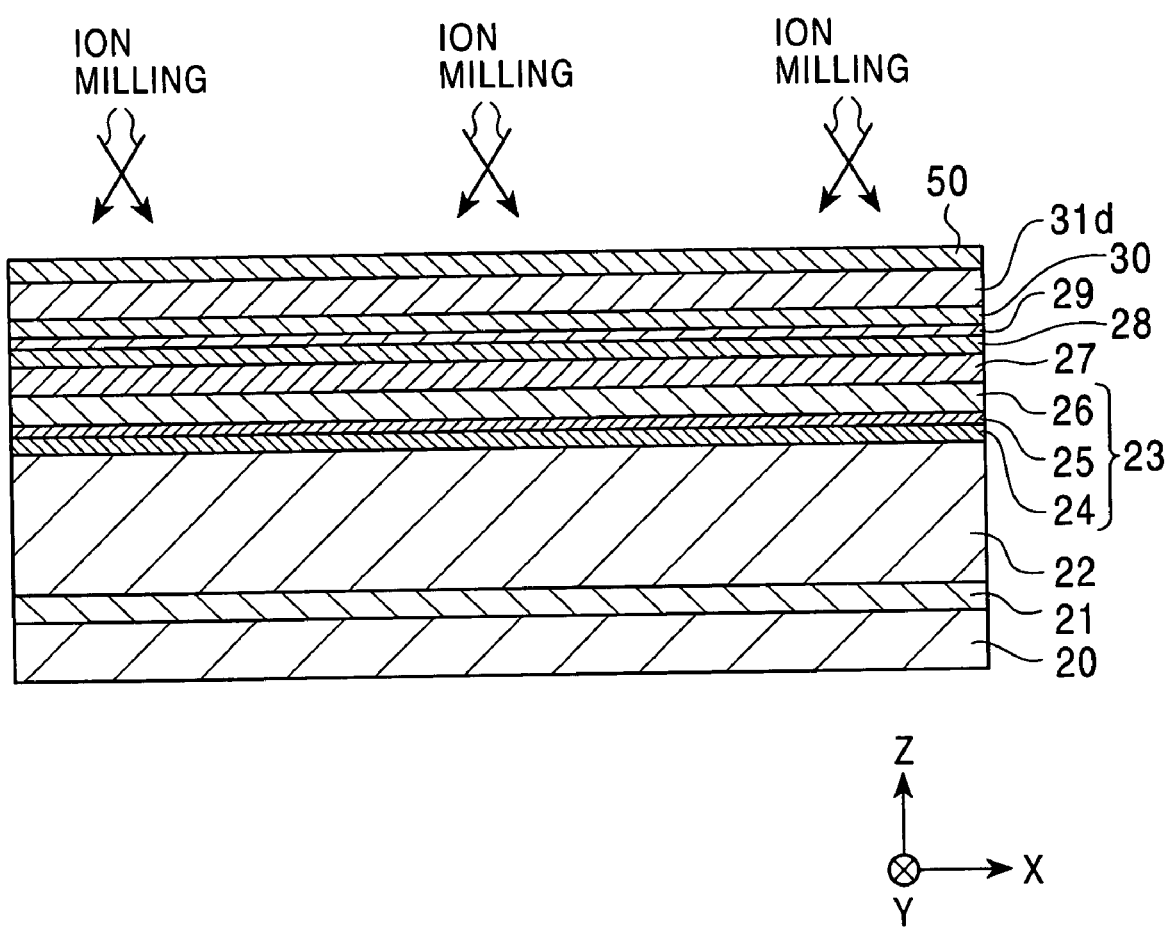
FIG. 5 is a representation of a step for manufacturing the magnetic detecting element shown in FIG. 1.

In a step shown in FIG. 5, on a substrate 20 are continuously deposited a seed layer 21, a first antiferromagnetic layer 22, a pinned magnetic layer 23, a nonmagnetic material layer 27, a free magnetic layer 28, a nonmagnetic interlayer 29, a first ferromagnetic layer 30, a lower sub layer 31d of a second antiferromagnetic layer 31, and a nonmagnetic layer 50 by sputtering or vapor deposition. The sputtering may be performed by dc magnetron sputtering, RF sputtering, ion beam sputtering, long-throw sputtering, collimation sputtering, or the like. The pinned magnetic layer 23 shown in FIG. 5 may have a artificial ferromagnetic structure including magnetic layers 24 and 26 formed of, for example, CoFe alloy and a nonmagnetic interlayer 25 formed of, for example, Ru between the magnetic layers 24 and 26. The free magnetic layer 28, which is formed of a magnetic material such as a NiFe alloy, and the nonmagnetic material layer 27 may have an anti-diffusion layer formed of a CoFe alloy or the like therebetween. Also, the nonmagnetic interlayer 29 and the free magnetic layer 28 may have a CoFe layer therebetween. Thus, the exchange coupling by RKKY interaction between the free magnetic layer 28 and the first ferromagnetic layer 30 can be strengthened.

Preferably, the first antiferromagnetic layer 22 and the lower sub layer 31d of the second antiferromagnetic layer 31 are formed of a PtMn alloy, an X—Mn alloy, or a Pt—Mn—X' alloy, wherein X is at least one element selected from the group consisting of Pd, Ir, Rh, Ru, Os, Ni, and Fe, and X' is at least one element selected from the group consisting of Pd, Ir, Rh, Ru, Au, Ag, Os, Cr, Ni, Ar, Ne, Xe, and Kr.

Preferably, the Pt content of the PtMn alloy and the X content of the X—Mn alloy are in the range of 37% to 63%. More preferably, the Pt content and the X content are in the range of 47% to 57%.

Preferably, the X' and Pt content of the Pt—Mn—X' alloy is in the range of 37% to 63%. More preferably, the X' and Pt content is in the range of 47% to 57%. In addition, preferably, X' content of the Pt—Mn—X' alloy is in the range of 0.2% to 10%. If X' is at least one element selected from the group consisting of Pd, Ir, Rh, Ru, Os, Ni, and Fe, however, the X' content is preferably in the range of 0.2% to 40%.

Preferably, the thickness of the first antiferromagnetic layer 22 is in the range of 80 to 300 Å. By forming the first antiferromagnetic layer 22 to a large thickness to this extent, a large exchange coupling magnetic field can be generated between the first antiferromagnetic layer 22 and the pinned magnetic layer 23 by annealing in a magnetic field. Specifically, the intensity of the exchange coupling magnetic field generated can be 48 kA/m or more, and, for example, more than 64 kA/m.

Preferably, the thickness of the lower sub layer 31d of the second antiferromagnetic layer 31 is in the range of 20 to 50 Å, and more preferably in the range of 30 to 40 Å.

By forming the lower sub layer 31d of the second antiferromagnetic layer 31 to a small thickness of 50 Å or less, the lower sub layer 31d assumes non-antiferromagnetic characteristics. Therefore, the lower sub layer 31d is hard to order-transform even by a first magnetic field annealing, described below. Consequently, since no exchange coupling magnetic field is generated between the lower sub layer 31d and the first ferromagnetic layer 30 or it is small if some generated, the magnetizations of the first ferromagnetic layer 30 and the free magnetic layer 28 are not fixed as firmly as that of the pinned magnetic layer 23.

If the thickness of the lower sub layer 31d of the second antiferromagnetic layer 31 is less than 20 Å, it is hard that the vicinity of the lower surface of the total second antiferromagnetic layer 31, including the upper sub layer 31c, which is provided on the lower sub layer 31d in a downstream step, assumes antiferromagnetic characteristics. Consequently, an exchange coupling magnetic field having a suitable intensity does not occur between the second antiferromagnetic layer 31 and the first ferromagnetic layer 30.

This is why the thickness of the lower sub layer 31d is desired to be 20 Å or more, and preferably 30 Å more.

As shown in FIG. 5, the first ferromagnetic layer 30 is provided on the free magnetic layer 28 with the nonmagnetic interlayer 29 therebetween, thereby forming a three-layer artificial ferrimagnetic structure.

The free magnetic layer 28 and the first ferromagnetic layer 30 are formed of substantially the same soft magnetic material, and the thickness t1 of the free magnetic layer 28 is set to be larger than the thickness t2 of the first ferromagnetic layer 30.

Preferably, the nonmagnetic interlayer 29 is formed of at least one element selected from the group consisting of Ru, Rh, Ir, Cr, Re, and Cu. The thickness of the nonmagnetic interlayer 29 is, for example, in the range of 6 to 11 Å. Such a small thickness allows an exchange coupling to occur between the free magnetic layer 28 and the first ferromagnetic layer 30 by RKKY interaction, and, thus, the magnetizations of the free magnetic layer 28 and the first ferromagnetic layer 30 become antiparallel to each other.

In the step shown in FIG. 5, a nonmagnetic layer 50 is formed on the lower sub layer 31d of the second antiferromagnetic layer 31. The nonmagnetic layer 50 can suitably prevent the lower sub layer 31d from oxidizing.

The nonmagnetic layer 50 must be a dense layer that is hard to oxidize by exposure to the atmosphere. In addition, the elements constituting the nonmagnetic layer 50 must not negatively affect the antiferromagnetic characteristics of the lower sub layer 31d of the second antiferromagnetic layer 31 even if the elements penetrate the lower sub layer 31d.

Preferably, the nonmagnetic layer 50 is formed of at least one noble metal selected from the group consisting of Ru, Re, Pd, Os, Ir, Pt, Au, and Rh.

The nonmagnetic layer 50 formed of a noble metal, such as Ru, is dense and hard to oxidize by exposure to the atmosphere. Accordingly, the nonmagnetic layer 50 suitably prevents the atmosphere from oxidizing the lower sub layer 31d of the second antiferromagnetic layer 31 even if the thickness thereof is small.

Preferably, the thickness of the nonmagnetic layer 50 is in the range of 3 to 10 Å. Even the nonmagnetic layer 50 having a thickness as small as in this range can suitably prevent the atmosphere from oxidizing the lower sub layer 31d of the second antiferromagnetic layer 31.

In the present invention, by forming the nonmagnetic layer 50 of a noble metal such as Ru to a small thickness in the range of 3 to 10 Å, ion milling to remove the nonmagnetic layer 50 can be performed at a lower energy than that in known techniques. Thus, the ion milling can advantageously be controlled.

In the low-energy ion milling, an ion beam having a beam voltage (acceleration voltage) of less than 1000 V is used. For example, a beam voltage of 100 to 500 V is used. In the present embodiment, an argon (Ar) ion beam having a low beam voltage of 200 V is used.

After depositing the layers up to the nonmagnetic layer 50 on the substrate 20 as shown in FIG. 5, the first annealing is performed in a magnetic field. While a first magnetic field is applied in a direction (Y direction) perpendicular to the track width Tw (X direction), the laminate is subjected to heat treatment at a first temperature to generate an exchange coupling magnetic field between the first antiferromagnetic layer 22 and the magnetic layer 24 of the pinned magnetic layer 23. Thus, the magnetization of the magnetic layer 24 is fixed in the Y direction. The magnetization of the other magnetic layer 26 of the pinned magnetic layer 23 is fixed in the opposite direction to the Y direction by exchange coupling resulting from RKKY interaction between the magnetic layers 24 and 26. The first heat treatment temperature is set at 270° C. and the intensity of the magnetic field is set at 800 kA/m.

As described above, no exchange coupling magnetic field is generated between the lower sub layer 31d of the second ferromagnetic layer 31 and the first ferromagnetic layer 30 by the first magnetic field annealing, or if some is generated, the intensity is low. This is because the lower sub layer 31d does not have antiferromagnetic characteristics due to its thickness as small as 50 Å or less.

The first magnetic field annealing probably allows a noble metal, such as Ru, in the nonmagnetic layer 50 to diffuse into the lower sub layer 31d. Consequently, the vicinity of the surface of the lower sub layer 31d contains the element constituting the second antiferromagnetic layer 31 and the noble metal after heat treatment. The noble metal diffused into the lower sub layer 31d is probably present more on its upper surface side, and the noble metal content decreases gradually from the upper surface of the lower sub layer 31d to the lower surface. This composition change can be confirmed by secondary ion mass spectrometry (SIMS) or energy-dispersive X-ray diffraction (EDX) using a transmission electron microscope (TEM).

The nonmagnetic layer 50 is removed to a small thickness as much as possible by ion milling in order to ensure antiferromagnetic interaction between the lower sub layer 31d and the upper sub layer 31c, which will be provided on the lower sub layer 31d in the following step.

In the step shown in FIG. 5, the nonmagnetic layer 50 may be entirely removed or partially removed to a small thickness of 3 Å or less. By removing the nonmagnetic layer 50 to this extent, the second antiferromagnetic layer 31 whose thickness is increased due to the additional upper sub layer 31c is able to serve as an antiferromagnetic body.

Ion milling can be performed at a low energy in the step shown in FIG. 5. This is because the nonmagnetic layers 50 has a very small thickness of 3 to 10 Å. This very thin nonmagnetic layer 50, which is formed of a noble metal, such as Ru, can prevent oxidization of the lower sub layer 31d of the second antiferromagnetic layer 31, and facilitates ion milling control in terms of the rate of removing the nonmagnetic layer 50.

Figure 6:
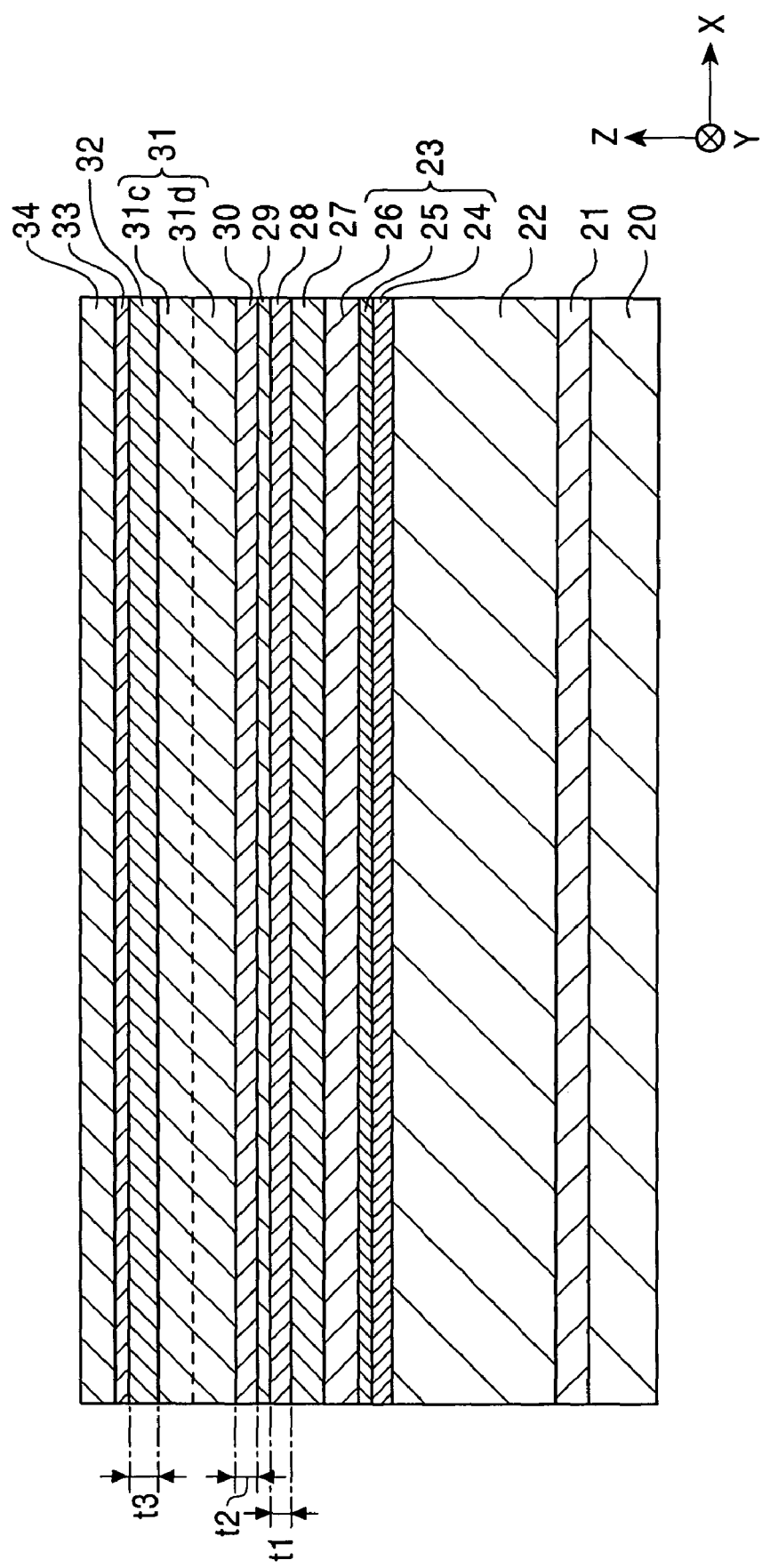
FIG. 6 is a representation of a step following the step shown in FIG. 5.

Turning to FIG. 6, the upper sub layer 31c of the second antiferromagnetic layer 31 is deposited on the thin lower sub layer 31d or the partially remaining nonmagnetic layer 50. These two sub layers 31d and 31c constitute the second antiferromagnetic layer 31. In this instance, the thickness of the second antiferromagnetic layer 31 is set in the range of 80 to 300 Å.

Then, a second ferromagnetic layer 32 is formed of a soft magnetic material, such as a CoFe or NiFe alloy, on the second antiferromagnetic layer 31.

The thickness t3 of the second ferromagnetic layer 32 is preferably in the range of 10 to 200 Å, and more preferably in the range of 20 to 90 Å.

Then, a first stopper layer 33 is provided on the second ferromagnetic layer 32. Preferably, the first stopper layer 33 is formed of at least one element selected from the group consisting of Cr, Ta, V, Nb, Mo, W, Fe, Co, Ni, Pt, and Rh to a thickness in the range of 30 to 100 Å.

Preferably, a first protective layer 34 is provided on the first stopper layer 33 to prevent the first stopper layer 33 and other underlying layers from oxidizing by exposure to the atmosphere. The first protective layer 34 also serves as part of a mask layer for etching the second antiferromagnetic layer 31. The first protective layer 34 is formed of, for example, Ta.

Then, a second annealing in a magnetic field is performed. In this instance, the direction of the magnetic field is in the track width direction (X direction). The intensity of the applied magnetic field is set lower than that of the exchange anisotropic magnetic field of the first antiferromagnetic layer 22 and lower than the spin flop magnetic field of the free magnetic layer 28 and the first ferromagnetic layer 30, and temperature of heat treatment is set lower than the blocking temperature of the first antiferromagnetic layer 22. Thus, the exchange anisotropic magnetic field of the second antiferromagnetic layer 31 can be oriented in the track width direction (X direction) with the exchange anisotropic magnetic field of the first antiferromagnetic layer 22 maintained in the height direction (Y direction), even though the first antiferromagnetic layer 22 and the second antiferromagnetic layer 31 are formed of the same material, such as above-described PtMn or a PtMnX alloy. This second heat treatment is performed at, for example, 250° C., and the intensity of the magnetic field is set at 24 kA/m.

The second magnetic field annealing allows the second antiferromagnetic layer 31 to order-transform suitably and, thus, an exchange coupling magnetic field with a suitable intensity occurs between the second antiferromagnetic layer 31 and the first ferromagnetic layer 30.

The free magnetic layer 28 and the first ferromagnetic layer 30 are formed of the same soft magnetic material, and the thickness t1 of the free magnetic layer 28 is larger than the thickness t2 of the first ferromagnetic layer 30. Hence, the magnetic moment per area of the free magnetic layer 28 is larger than that of the first ferromagnetic layer 30.

Consequently, the magnetization of the free magnetic layer 28 is fixed in the track width direction (X direction), which is the direction of the applied magnetic field for the second magnetic field annealing. On the other hand, the magnetization of the first ferromagnetic layer 30 is fixed antiparallel to the magnetization direction of the free magnetic layer 28 (antiparallel to the track width direction or X direction) by RKKY interaction between the first ferromagnetic layer 30 and the free magnetic layer 28.

At the same time, an exchange coupling magnetic field with a suitable intensity occurs between the second antiferromagnetic layer 31 and the second ferromagnetic layer 32, thereby fixing the magnetization of the second ferromagnetic layer 32 in the track width direction.

Thus, the magnetizations of the first ferromagnetic layer 30 and the second ferromagnetic layer 32 are fixed antiparallel to each other only by the second magnetic field annealing.

Figure 7:
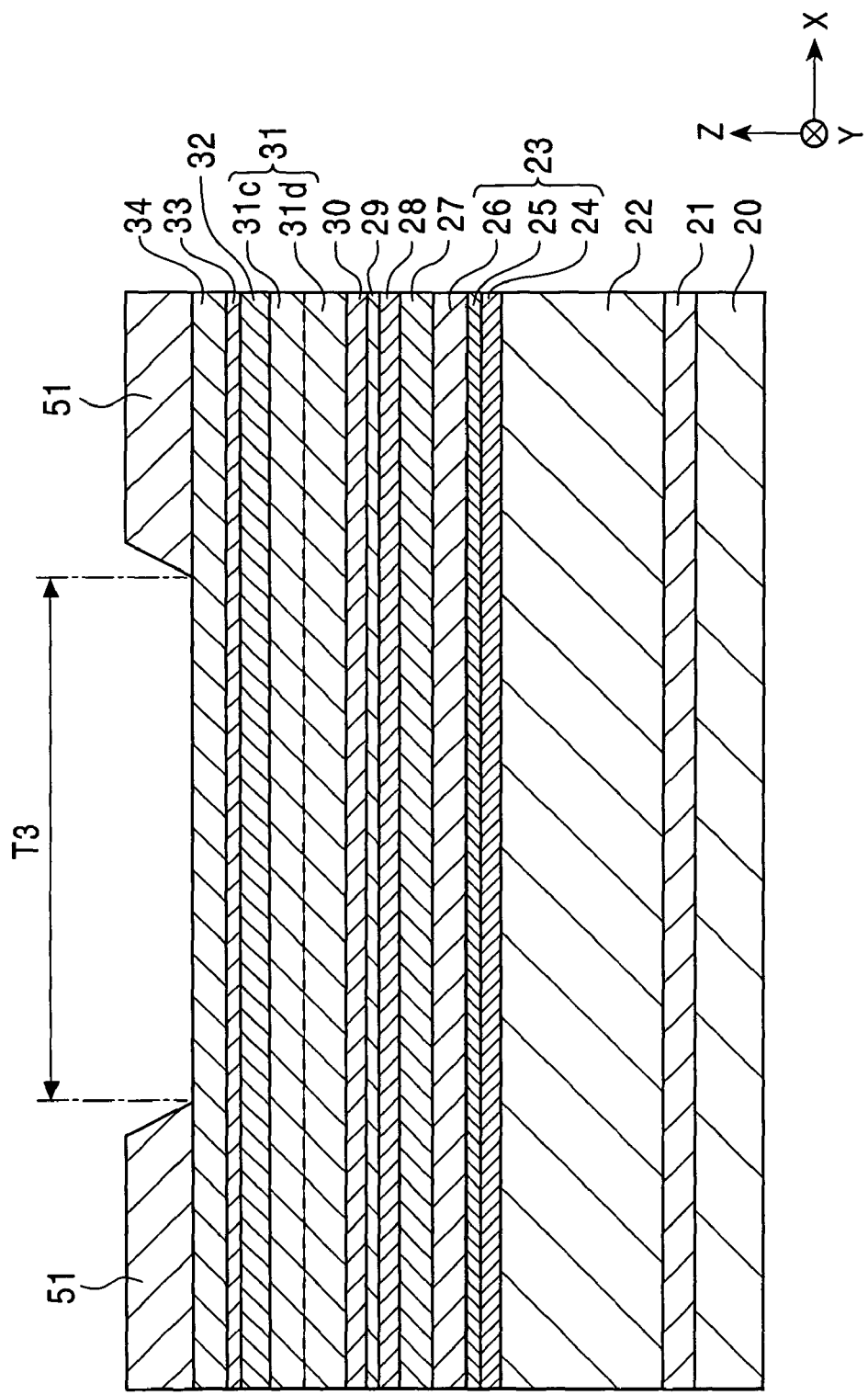
FIG. 7 is a representation of a step following the step shown in FIG. 6.

Turning to FIG. 7, mask layers 51 are formed on the first protective layer 34, with a predetermined distance T3 in the track width direction (X direction). The distance T3 is larger than the track width Tw. The mask layers 51 are formed of a material not removed or hard to remove by RIE. The mask layers 51 may be formed of a resist or a metal. Metal mask layers 51 can be used as part of an electrode if they are left. In the step shown in FIG. 7, the mask layers 5 are formed of a metal, such as Cr. In this step, portions not covered with the mask layers 51 of the first protective layer 34, first stopper layer 33, and second antiferromagnetic layer 31 are etched, and at least the portions underlying the mask layers 51 of the first protective layer 34 need to be maintained until the end of the etching step. Therefore the material and the thickness of the mask layers 51 need to be suitably selected. For example, if the mask layers 51 and the first stopper layer 33 are formed of Cr, the thickness of the mask layers 51 must be larger than that of the first stopper layer 33; otherwise, the mask layers 51 will not remain on the first protective layer 34 when the stopper layer 33 is entirely removed. Also, the mask layers 51 and the first protective layer 34 are, preferably, formed of a material having an etching rate lower than that of the material of the second antiferromagnetic layer 31, or a material not etched by the gas for etching the second antiferromagnetic layer 31.

If the mask layers 51 are formed of a metal, the thickness thereof is, preferably, in the range of 50 to 300 Å.

For providing the mask layers 51, for example, a lift-off resist layer (not shown in the figure) is formed on the region of the first protective layer 34 where the space with a distance T3 between the mask layers 51 is to be formed, and Cr or the like is deposited on both end portions of the first protective layer 34 by sputtering. Then, the resist layer is removed to complete the mask layers 51.

Figure 8:
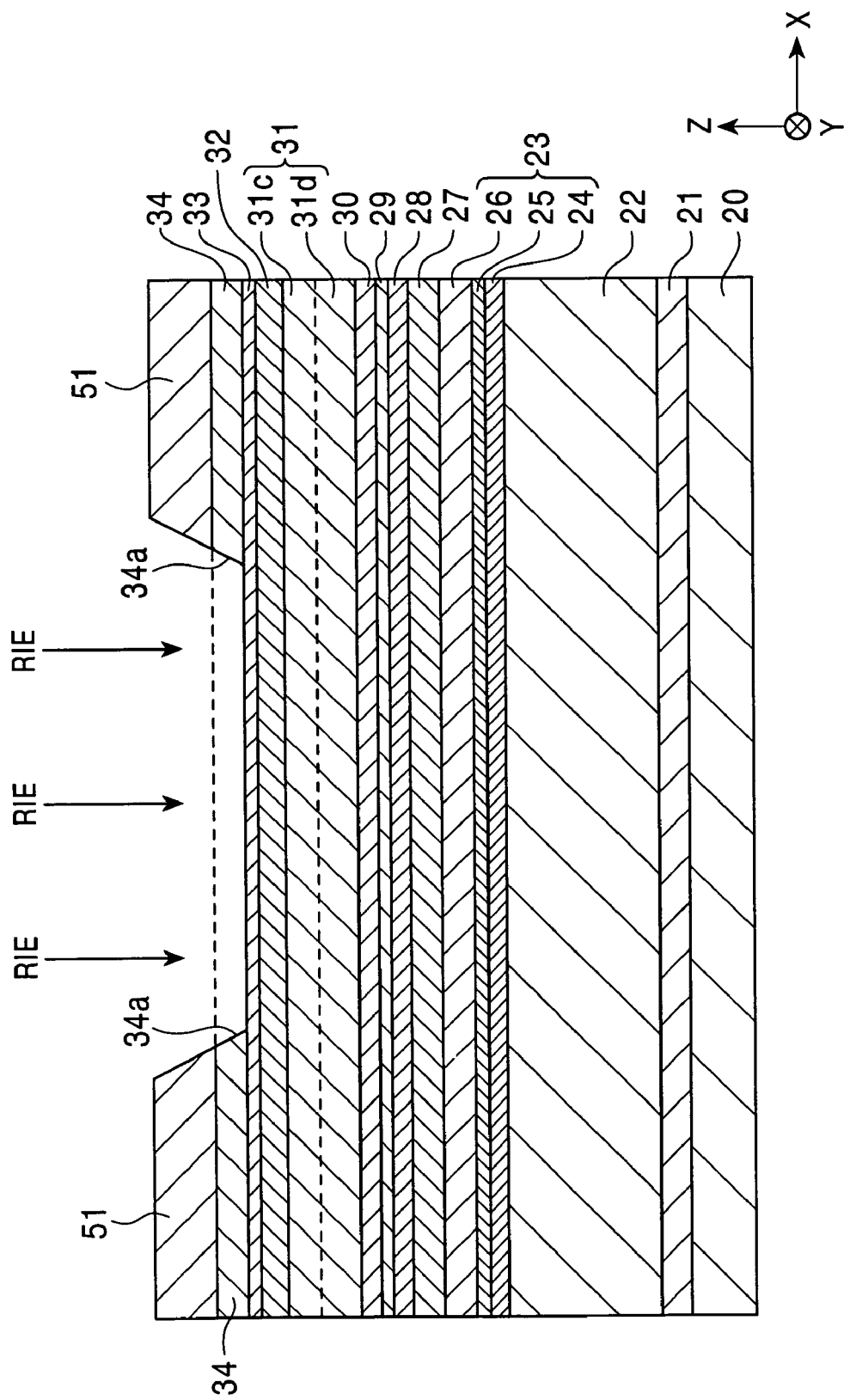
FIG. 8 is a representation of a step following the step shown in FIG. 7.

Turning to FIG. 8, the portions not covered with the mask layers 51 of the first protective layer 34 is removed by etching. Preferably, RIE is applied to this step. The etching gas may be $CF_4$, $C_3F_8$, or a mixture of Ar and $CF_4$ or $C_3F_8$ and Ar.

After the removal of the first protective layer 34, designated by the dotted line in FIG. 8, the surface of the first stopper layer 33 is exposed. The first stopper layer 33 is not entirely removed even by over-etching the first protective layer 34. By over-etching the first protective layer 34 exposed between the mask layers 51, the internal side surfaces 34a of the first protective layer can be suitably inclined or bent and the first protective layer 34 is not allowed to partially remain on the first stopper layer 33.

Figure 9:
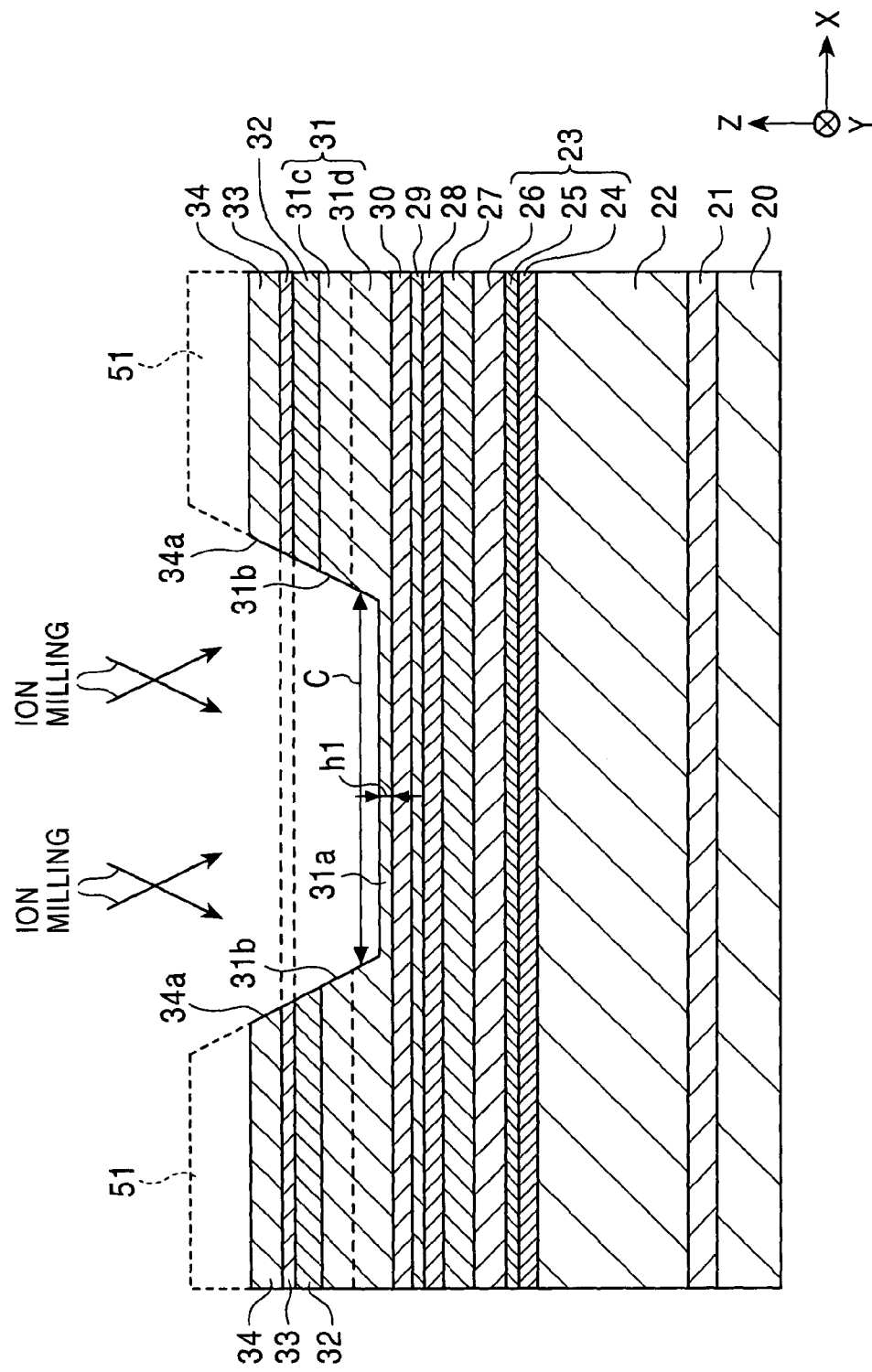
FIG. 9 is a representation of a step following the step shown in FIG. 8.

In a step shown in FIG. 9, the entirety of the portion of the first stopper layer 33 (designated by dotted lines), exposed between the mask layers 51 and part of the second antiferromagnetic layer 31 underlying the first stopper layer 33 (designated by the dotted line in the antiferromagnetic layer) are removed by ion milling. In this step, the mask layers 51 are also removed. As shown in FIG. 9, the second antiferromagnetic layer 31 remains at a thickness h1 in the central portion of the element. This portion with a thickness h1 corresponds to the internal end portions 31a of the second antiferromagnetic layer 31, and is referred to as the antiferromagnetic layer 31a here for convenience. The thickness h1 is 50 Å or less, and preferably 40 Å or less. By reducing the thickness of the second antiferromagnetic layer 31a to 50 Å or less, the exchange coupling magnetic field generated between the first ferromagnetic layer 30 and the second antiferromagnetic layer 31a is eliminated or weakened. If the second magnetic field annealing is performed after the step shown in FIG. 9, but not after the step shown in FIG. 6, the second antiferromagnetic layer 31a has no or small ferromagnetic characteristics because of its difficulty of order transformation. The removal quantity of the second antiferromagnetic layer 31 can be controlled through monitoring with an SIMS analyzer contained in an ion milling apparatus. The second antiferromagnetic layer 31a may be entirely removed to expose the surface of the first ferromagnetic layer 30. However, it is difficult to stop etching at the instant when the entire second antiferromagnetic layer 31a has been removed, and the etching affects the first ferromagnetic layer 30. Therefore, it is preferable that the second antiferromagnetic layer 31a be allowed to remain at a small thickness of 50 Å or less, as shown in FIG. 9.

By removing the first protective layer 34, first stopper layer 33, second antiferromagnetic layer 31 exposed between the mask layers 51 by ion milling, these layers are each divided into two and, thus, the internal side surfaces 34a of the resulting first protective layers 34 and the internal side surfaces 31b of the resulting second antiferromagnetic layers 31 are formed to continuous, flush inclined or bent surfaces. In the ion milling step shown in FIG. 9, the mask layers 51 may be entirely removed, as designated by dotted lines, or it may be allowed to remain slightly.

After ion milling, in order to determine the height of the magnetic detecting element (length in the Y direction), the laminate is patterned into a predetermined shape to remove the back in the Y direction of the element. The removed region is provided with an insulating layer (backfill gap layer) formed of $Al_2O_3$ or the like.

Figure 10:
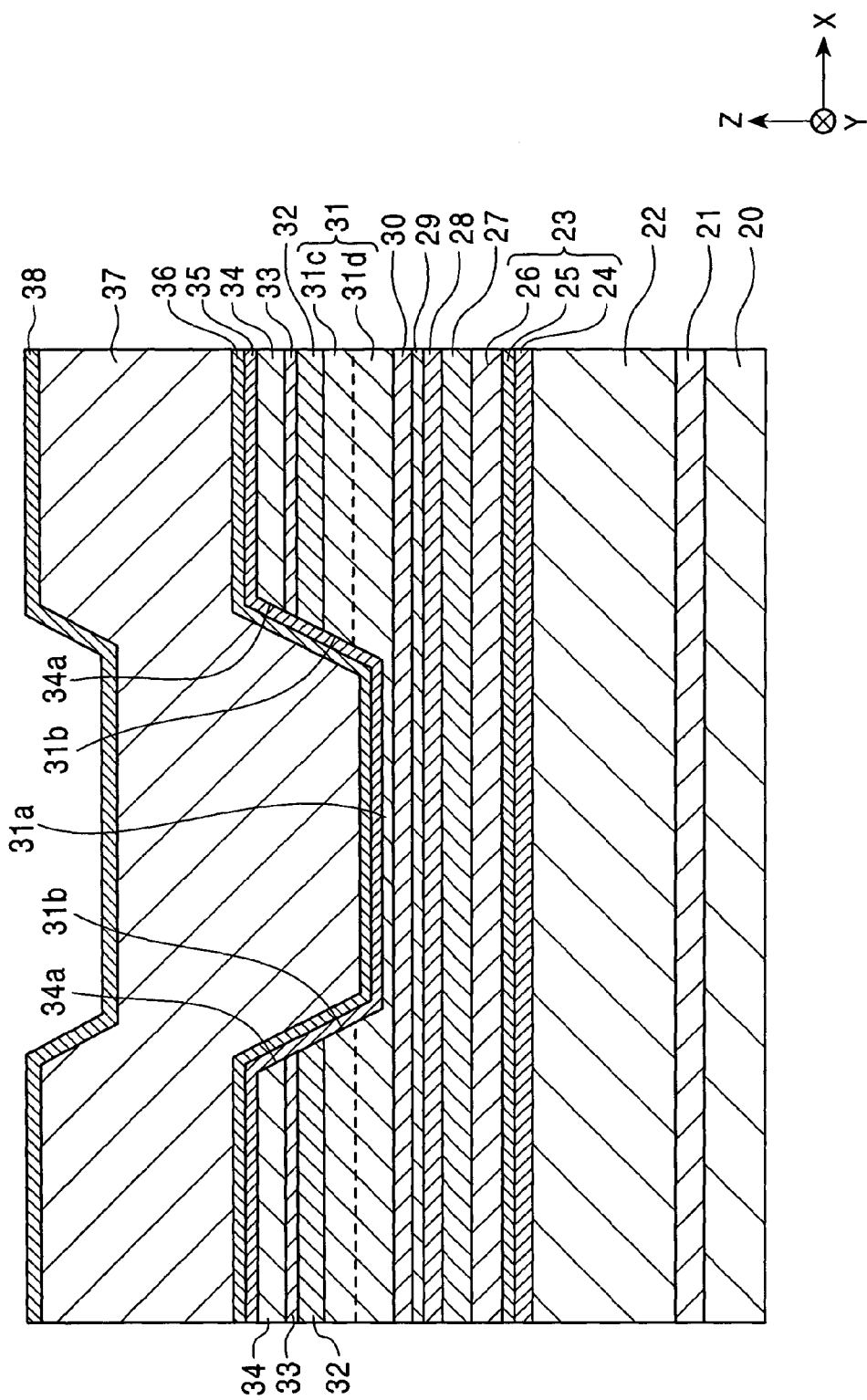
FIG. 10 is a representation of a step following the step shown in FIG. 9.

Turning to FIG. 10, a second stopper layer 35 is provided over the upper surfaces and side surfaces 34a of the first protective layer 34, the internal side surfaces 31b of the second antiferromagnetic layer 31, and the remaining second antiferromagnetic layer 31a in the central portion, and is subsequently covered with a second protective layer 36. Then, an electrode layer 37 is formed on the second protective layer 36, and is subsequently covered with a third protective layer 38. The second stopper layer 35 is formed of a material capable of use for the first stopper layer 33. The second protective layer 36 and the third protective layer 38 are formed of a material capable of use for the first protective layer 34.

The electrode layer 37 is formed of a nonmagnetic conductive material, such as Au, Pd, Cr, Rh, Ru, Ta, or W.

The second stopper layer 35 must be conductive. This is because the second stopper layer 35 will be partially left under the internal end portions 37b of the resulting electrode layers 37, as shown in FIG. 1, so that sense current can flow from one of the internal end portions 37b of the electrode layers 37 to the multilayer laminate 40. An insulating second stopper layer 35 will disadvantageously block the flow of sense current.

Preferably, the material of the second stopper layer 35 has an etching rate lower than that of the material of the electrode layer 37. Alternatively, the material of the second stopper layer 35 is not etched by the etching gas used for etching the electrode layer 37. For example, the electrode layer 37 is formed of Au and etched by Ar gas or a mixture of Ar and $C_3F_8$ gases. In this instance, the etching rate for the mixture of Ar and $C_3F_8$ gases of the second stopper layer 35 can be reduced to a level lower than the etching rate of the electrode layer 37 by use of Cr or the like for the second stopper layer 35.

If the second stopper layer 35 is formed of Cr and the electrode layer 37 is formed of Au, these elements are liable to diffuse each other. In order to prevent the diffusion, the second protective layer 36 formed of Ta or the like is, preferably, provided between the second stopper layer 35 and the electrode layer 37. If the diffusion does not occur, the second protective layer 36 is not necessary.

The third protective layer 38 is intended to prevent the electrode layer 37 from oxidizing by exposure of the atmosphere.

Since, as described above, the height of the element has already been set at a predetermined value before the step shown in FIG. 10, the end surface in the height direction (Y direction) of the electrode layer 37 can be jutted out over the end in the height direction of the laminate including the substrate 20 to the second antiferromagnetic layer 31. Thus, the resistance of the element can be reduced and the resulting magnetic detecting element can produce a large reproduction output.

Figure 11:
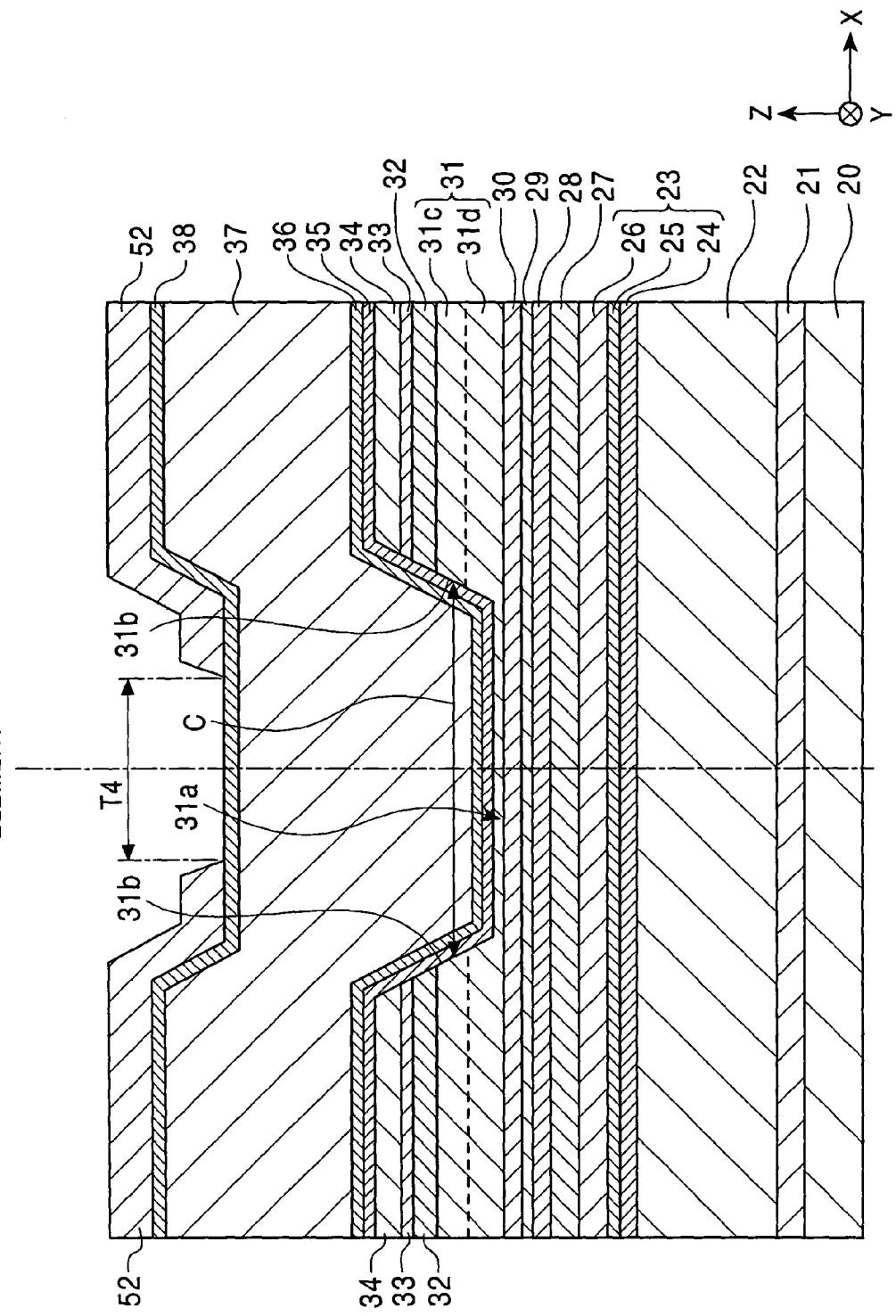
FIG. 11 is a representation of a step following the step shown in FIG. 10.

Turning to FIG. 11, mask layers 52 are formed on the third protective layer 38, with a predetermined distance T4 in the track width direction (X direction). In this instance, the center in the track width direction of the space between the mask layers 52 is aligned with the center in the track width direction of the element. The mask layers 52 are formed of a material not removed or hard to remove by RIE. The mask layers 52 may be formed of a resist or a metal. In the step shown in FIG. 11, the mask layers 52 are formed of a metal, such as Cr. In the following step are etched portions not covered with the mask layers 52 of the electrode layer 37, the second antiferromagnetic layer 31a remaining in the central portion of the element, the first ferromagnetic layer 30, and other layers. The mask layers 52 and portions underlying the mask layers 52 of the third protective layer 38 need to be maintained until the end of the etching step. Therefore the material and the thickness of the mask layers 52 need to be suitably selected. Preferably, the mask layers 52 is formed of a material having an etching rate lower than that of the material of the electrode layer 37, or a material not etched.

If the mask layers 52 are formed of a metal, the thickness thereof is, preferably, in the range of 100 to 500 Å.

For providing the mask layers 52, for example, a lift-off resist layer (not shown in the figure) is formed on the region of the third protective layer 38 where the space with a distance T4 between the mask layers is to be formed, and Cr or the like is deposited on both end portions of the third protective layer 38 by sputtering. Then, the resist layer is removed to complete the mask layers 52.

Preferably, the distance T4 between the mask layers 52 is set smaller than the distance C in the track with direction between the internal side surfaces 31b of the resulting second antiferromagnetic layers 31, except in case where etching is performed so as to incline or bend the internal side surfaces 37a of the electrode layers 37.

Figure 12:
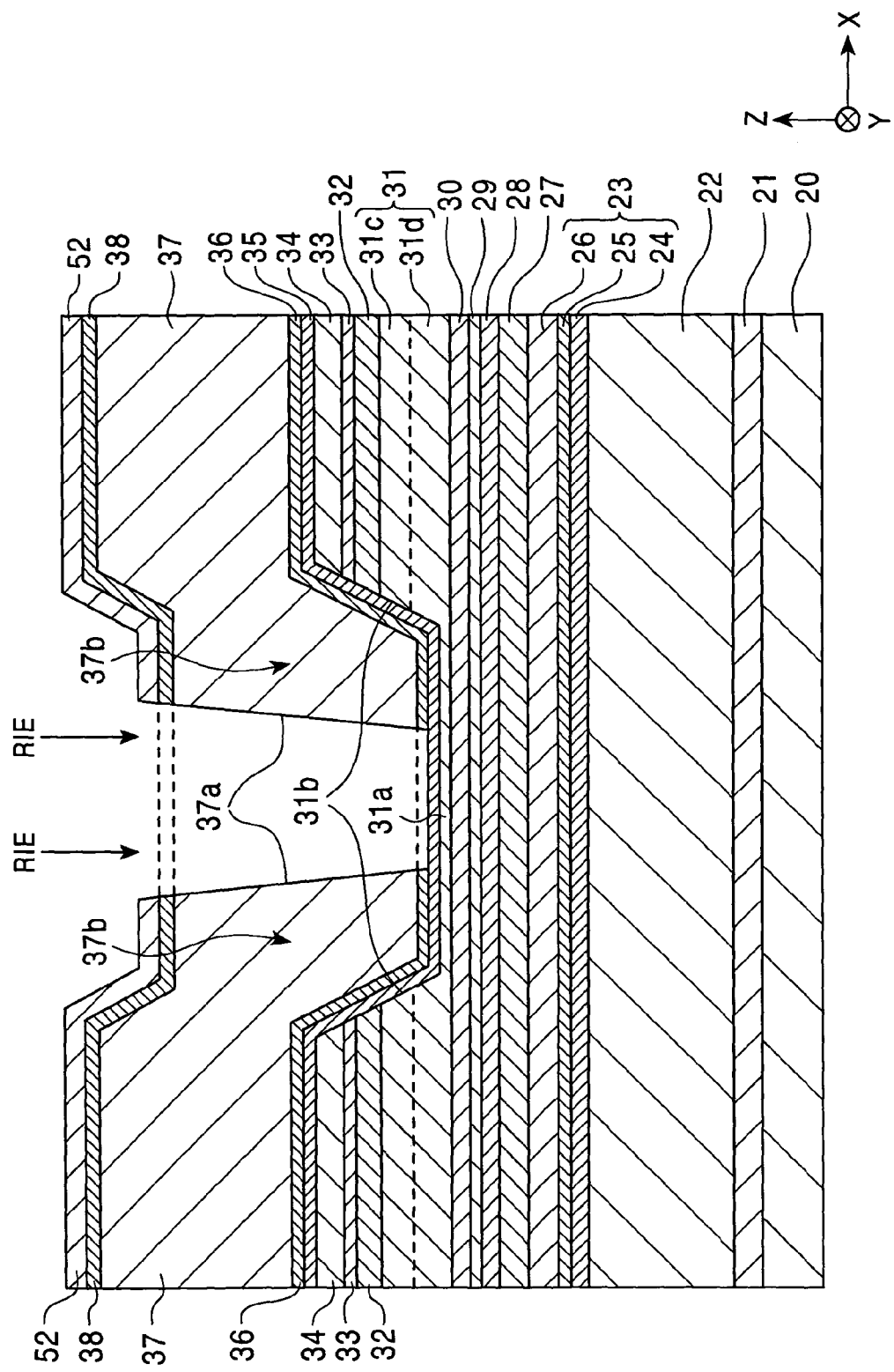
FIG. 12 is a representation of a step following the step shown in FIG. 11.

In the step shown in FIG. 12, the portions not covered with the mask layers 52 of the third protective layer 38 and electrode layer 37 (designated by dotted lines in the figure) are etched to be removed. Preferably, RIE is applied to this step. The etching gas may be $CF_4$, $C_3F_8$, or a mixture of Ar and $CF_4$ or $C_3F_8$ and Ar.

By removing the portions designated by dotted lines of the third protective layer 38, electrode layer 37, and second protective layer 36, the surface of the second stopper layer 35 is exposed. Since the exposed surface is of the second stopper layer 35, over-etching can be performed to entirely remove the electrode layer 37 in this region without fear of entire removal of the second stopper layer 35. By over-etching the electrode layer 37, the internal side surfaces 37a of the electrode layer 37 can be inclined or bent such that the distance therebetween gradually increases from below upward (in the Z direction), and the electrode layer 37 is not allowed to partially remain on the second stopper layer 35.

Figure 13:
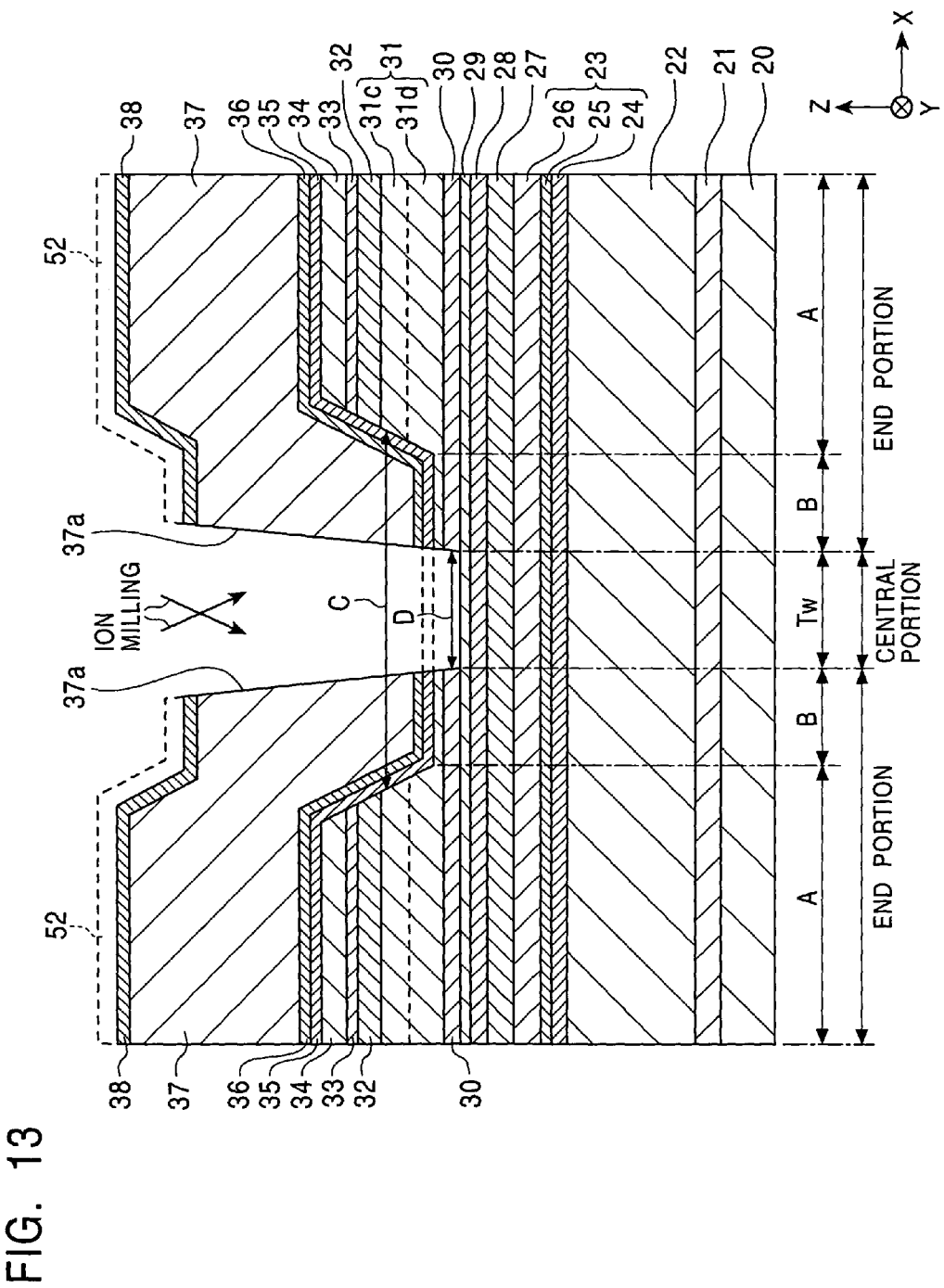
FIG. 13 is a representation of a step following the step shown in FIG. 12.

In a step shown in FIG. 13, the portion of the second stopper layer 35 (designated by dotted lines), exposed between the mask layers 52 and the second antiferromagnetic layer 31a underlying the second stopper layer 35 are removed by ion milling. Furthermore, ion milling is continued until the exposed portion of the first ferromagnetic layer 30 is entirely removed. This removal quantity of ion milling can be controlled using an SIMS analyzer. In particular, ion milling here can be performed at a low energy because the thicknesses of the layers to be removed are small. Consequently, ion milling can advantageously be controlled so as to be stopped at the instant accurately when the entire first ferromagnetic layer 30 has been removed.

In the low-energy ion milling, an ion beam having a beam voltage (acceleration voltage) of less than 1000 V is used. For example, the beam voltage is in the range of 100 to 500 V. In the present embodiment, an argon (Ar) ion beam having a low beam voltage of 200 V is used.

In the ion milling step shown in FIG. 13, the nonmagnetic interlayer 29 underlying the first ferromagnetic layer 30 is maintained as it is. However, it may be partially removed, or entirely removed to expose the surface of the free magnetic layer 28. Also, in the ion milling step, the portion of the first ferromagnetic layer 30 exposed between the mask layers 52 is entirely removed, but it may be allowed to remain partially.

After ion milling, while the central portion of the element has no first ferromagnetic layer 30 above the free magnetic layer 28, artificial ferrimagnetic structures are constituted of the free magnetic layer 28 and the first ferromagnetic layers 30 with the nonmagnetic interlayer 29 therebetween in regions B of the end portions. The artificial ferrimagnetic structures in regions B have essentially no second antiferromagnetic layer 31 on the first ferromagnetic layer 30 thereof (the internal end portions 31a of the second antiferromagnetic layer 31 remains with a very small thickness, in FIG. 13). In regions A of the end portions of the element, artificial ferrimagnetic structures are constituted of the free magnetic layer 28 and the first ferromagnetic layer 30 with the nonmagnetic interlayer 29 therebetween, and which have the second antiferromagnetic layer 31 with a large thickness on the first ferromagnetic layer 30.

The track width Tw is determined by the distance D in the track width direction between the lower surfaces of the resulting first ferromagnetic layers 30.

The ion milling in the step shown in FIG. 13 divides the first ferromagnetic layer 30 into two to form the internal side surfaces 30a of the first ferromagnetic layers 30, thereby generating surface magnetic charge. However, since the magnetizations of the first ferromagnetic layers 30 and the second ferromagnetic layers 32 have been fixed antiparallel to each other by the second magnetic field annealing in FIG. 6, magnetostatic coupling can occur between the internal side surfaces 30a of the first ferromagnetic layers 30 and the internal side surfaces 32a of the second ferromagnetic layers 32. Thus, the static magnetic field from the first ferromagnetic layers 30 to the central portion of the free magnetic layer 28 can be weakened.

After the step of FIG. 13, the fourth protective layer 39 is formed over the third protective layers 38, the internal side surfaces 37a of the electrode layers 37, and the exposed nonmagnetic interlayer 29. If the exposed portion of the nonmagnetic interlayer 29 is entirely removed to expose the surface of the free magnetic layer 28, the fourth protective layer 39 can be allowed to serve as a specular layer. For the specular layer, the fourth protective layer 39 may be formed of Ta to a thickness in the range of about 10 to 20 Å and is oxidized. By providing the fourth protective layer 39, the electrical insulation between the electrode layers 37 and the upper shield layer, which will be formed in a downstream step, can be enhanced.

A method for manufacturing the magnetic detecting element shown in FIG. 3 will now be described.

In manufacture of the magnetic detecting element shown in FIG. 3, substantially the same steps described with reference to FIGS. 6 to 9 are performed. However, the present method is different in that the Ta layer 61a is directly provided on the second antiferromagnetic layer 31 without forming the second ferromagnetic layer 32 in the step of FIG. 6. The Ta layer 61a has the same function as that of the first protective layer 34 shown in FIGS. 6 to 9. A layer formed of Cr as in the first stopper layer 33 may be provided between the second antiferromagnetic layer 31 and the Ta layer 61a.

After the central portion of the second antiferromagnetic layer 31 is removed in the step of FIG. 9, in order to determine the height of the magnetic detecting element (length in the Y direction), the laminate is patterned into a predetermined shape to remove the back in the Y direction of the element. The removed region is provided with an insulating layer (backfill gap layer) formed of $Al_2O_3$ or the like.

Figure 14:
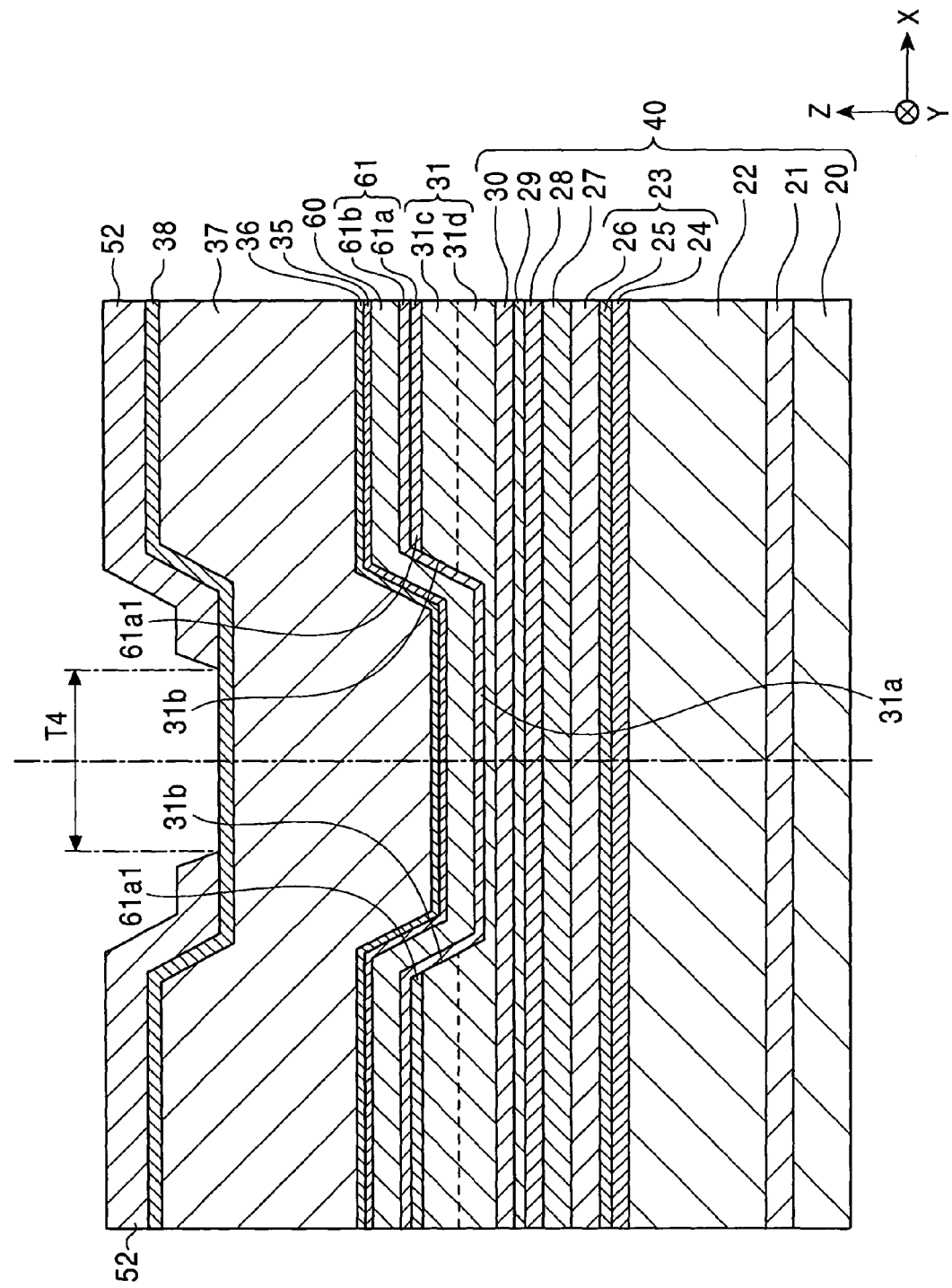
FIG. 14 is a representation of a step for manufacturing the magnetic detecting element shown in FIG. 3.

Then, in a step shown in FIG. 14, over the upper surface and internal side surfaces 61a1 of the Ta layer 61a and the internal side surfaces 31b and central potion 31a of the second antiferromagnetic layer 31 are deposited the base layer 61b, the second ferromagnetic layer 60 formed of a hard magnetic material, the second stopper layer 35, and the second protective layer 36. Then, the electrode layer 37 is formed on the second protective layer 36, and is subsequently covered with the third protective layer 38.

The second ferromagnetic layer 60 is formed of CoPt, CoCrPt, or the like. The second protective layer 36 may not be provided unless diffusion of component elements, as in the step of FIG. 10, occurs between the second stopper layer 35 and the electrode layer 37.

In the step of FIG. 14, as above, the end surface in the height direction (Y direction) of the electrode layer 37 can be jutted out over the end in the height direction of the laminate including the substrate 20 to the second antiferromagnetic layer 31. Thus, the resistance of the element can be reduced and the resulting magnetic detecting element can produce a large reproduction output.

Also, mask layers 52 are formed on the third protective layer 38, with a predetermined distance T4 in the track width direction (X direction). In this instance, the center in the track width direction of the space with a distance T4 between the mask layers 52 is aligned with the center in the track width direction of the element. The mask layers 52 are formed of Cr as in the step of FIG. 11. Preferably, the thickness of the mask layers 52 is in the range of 100 to 500 Å.

Preferably, the distance T4 between the mask layers is smaller than the distance C in the track with direction between the internal side surfaces 31b of the second antiferromagnetic layer 31, except in case where etching is performed so as to incline or bend the internal side surfaces 37a of the electrode layer 37.

Figure 15:
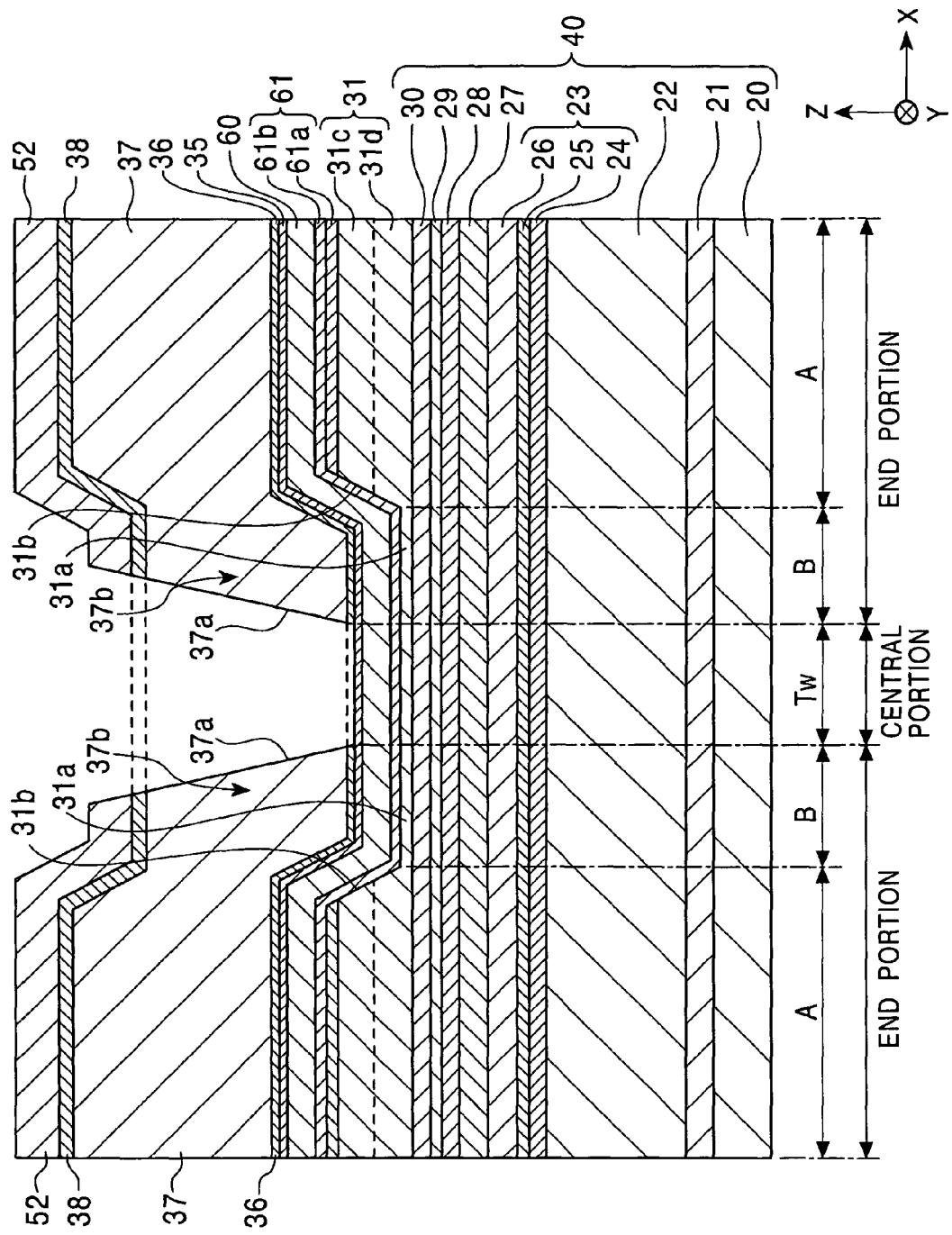
FIG. 15 is a representation of a step following the step shown in FIG. 14.

In the step shown in FIG. 15, the portions not covered with the mask layers 52 of the third protective layer 38 and electrode layer 37 (designated by dotted lines in the figure) are etched to be removed. Preferably, RIE is applied to this step. The etching gas may be $CF_4$, $C_3F_8$, or a mixture of Ar and $CF_4$ or $C_3F_8$ and Ar.

Since the surface of the second stopper layer 35 is exposed by removing the portions designated by dotted lines of the third protective layer 38, electrode layer 37, and second protective layer 36, over-etching can be performed to remove the entire electrode layer 37 without fear of entire removal of the second stopper layer 35. By over-etching the electrode layer 37, the internal side surfaces 37a of the electrode layer 37 can be inclined or bent such that the distance therebetween gradually increases from below upward (in the Z direction), and the electrode layer 37 is not allowed to partially remain on the second stopper layer 35.

Then, the second stopper layer 35 exposed between the mask layers 52, and the second ferromagnetic layer 60, and the bas layer 61b are removed by ion milling. Furthermore, ion milling is continued until the remaining second antiferromagnetic layer 31a and the first ferromagnetic layer 30 are entirely removed. This removal quantity of ion milling can be controlled using an SIMS analyzer. In particular, ion milling here can be performed at a low energy because the thicknesses of the layers to be removed are small. Consequently, ion milling can advantageously be controlled so as to be stopped at the instant accurately when the entire first ferromagnetic layer 30 has been removed.

In the low-energy ion milling, an ion beam having a beam voltage (acceleration voltage) of less than 1000 V is used. For example, the beam voltage is in the range of 100 to 500 V. In the present embodiment, an argon (Ar) ion beam having a low beam voltage of 200 V is used.

Although the nonmagnetic interlayer 29 underlying the first ferromagnetic layer 30 is maintained as it is, it may be partially removed, or entirely removed to expose the surface of the free magnetic layer 28. Also, in the ion milling step, the portion of the first ferromagnetic layer 30 exposed between the mask layers 52 is entirely removed, but it may remain partially. The mask layers 52 are entirely removed in the ion milling step.

After ion milling, while the central portion of the element does not have the first ferromagnetic layer 30 on the free magnetic layer 28, artificial ferrimagnetic structures are constituted of the free magnetic layer 28 and the first ferromagnetic layer 30 with the nonmagnetic interlayer 29 therebetween in regions B of the end portions. The artificial ferrimagnetic structures in regions B have essentially no second antiferromagnetic layer 31 on the first ferromagnetic layer 30. In regions A of the end portions of the element, ferrimagnetic structures are constituted of the free magnetic layer 28 and the first ferromagnetic layer 30 with the nonmagnetic interlayer 29 therebetween, and which have the second antiferromagnetic layer 31 with a large thickness on the first ferromagnetic layer 30.

In the ion milling step, the first ferromagnetic layer 30 and the second ferromagnetic layer 60 are each divided into two layers to form continuous, flush internal side surfaces 30a and 60a of the first ferromagnetic layers and second ferromagnetic layers 60. Hence, the second ferromagnetic layers 60 lie over the second antiferromagnetic layers 31 and the portions in regions B of the first ferromagnetic layers 30, and, thus, the distance between the internal side surfaces 60a of the second ferromagnetic layers 60 and the internal side surfaces 30a of the first ferromagnetic layers 30 decreases.

Consequently, the magnetostatic coupling between the first ferromagnetic layers 30 and the second ferromagnetic layers 60 is strengthened, thereby making it hard that the static magnetic field enters the central portion of the free magnetic layer 28. As a result, the central portion of the free magnetic layer 28 certainly maintains the single magnetic domain state thereof to further reduce the hysteresis and suppress the occurrence of Barkhausen noises.

Furthermore, the fourth protective layer 39 is formed over the third protective layers 38, the internal side surfaces 37a of the electrode layers 37, and the exposed nonmagnetic interlayer 29 as shown in FIG. 3. If the nonmagnetic interlayer 29 is entirely removed to expose the surface of the free magnetic layer 28, the fourth protective layer 39 can be allowed to serve as a specular layer. For the specular layer, the fourth protective layer 39 may be formed of Ta to a thickness in the range of about 10 to 20 Å and is oxidized. By providing the fourth protective layer 39, the insulation between the electrode layer 37 and the upper shield layer, which will be formed in a downstream step, can be enhanced.

Finally, the resulting composite is placed in a magnetic field in the track width direction, and the second ferromagnetic layers 60 are magnetized in the track width direction at room temperature to complete the magnetic detecting element shown in FIG. 3. This step of magnetizing the second ferromagnetic layers 60 at room temperature does not affect the exchange coupling magnetic field between the second antiferromagnetic layers 31 and the first ferromagnetic layers 30. Therefore, the magnetic moment per area of the free magnetic layer 28 may be larger or smaller than that of the first ferromagnetic layers 30, as long as the magnetization is performed so as to set the magnetization directions of the first ferromagnetic layers 30 and the second ferromagnetic layers 60 to be antiparallel.

In the step of FIG. 6, the nonmagnetic layer 61 and the second ferromagnetic layer 60 may be deposited all over the second antiferromagnetic layer 31. The central portions of the second ferromagnetic layer 60 and the second antiferromagnetic layer 31 are removed as in the step of FIG. 9 and, then, the electrode layer 37 is formed. Such a process can provide a magnetic detecting element in which the second ferromagnetic layers 60 formed of a hard magnetic material overlie only the portions of the second antiferromagnetic layers 31, having a large thickness in regions A, which exhibit antiferromagnetic characteristics.

A method for manufacturing the magnetic detecting element shown in FIG. 4 will now be described.

In the method for manufacturing the magnetic detecting element shown in FIG. 4, the process up to the steps of removing the central portion of the second antiferromagnetic layers 31 of the element and forming the backfill gap layer is the same as in the method forming the magnetic detecting element shown in FIG. 3.

Figure 16:
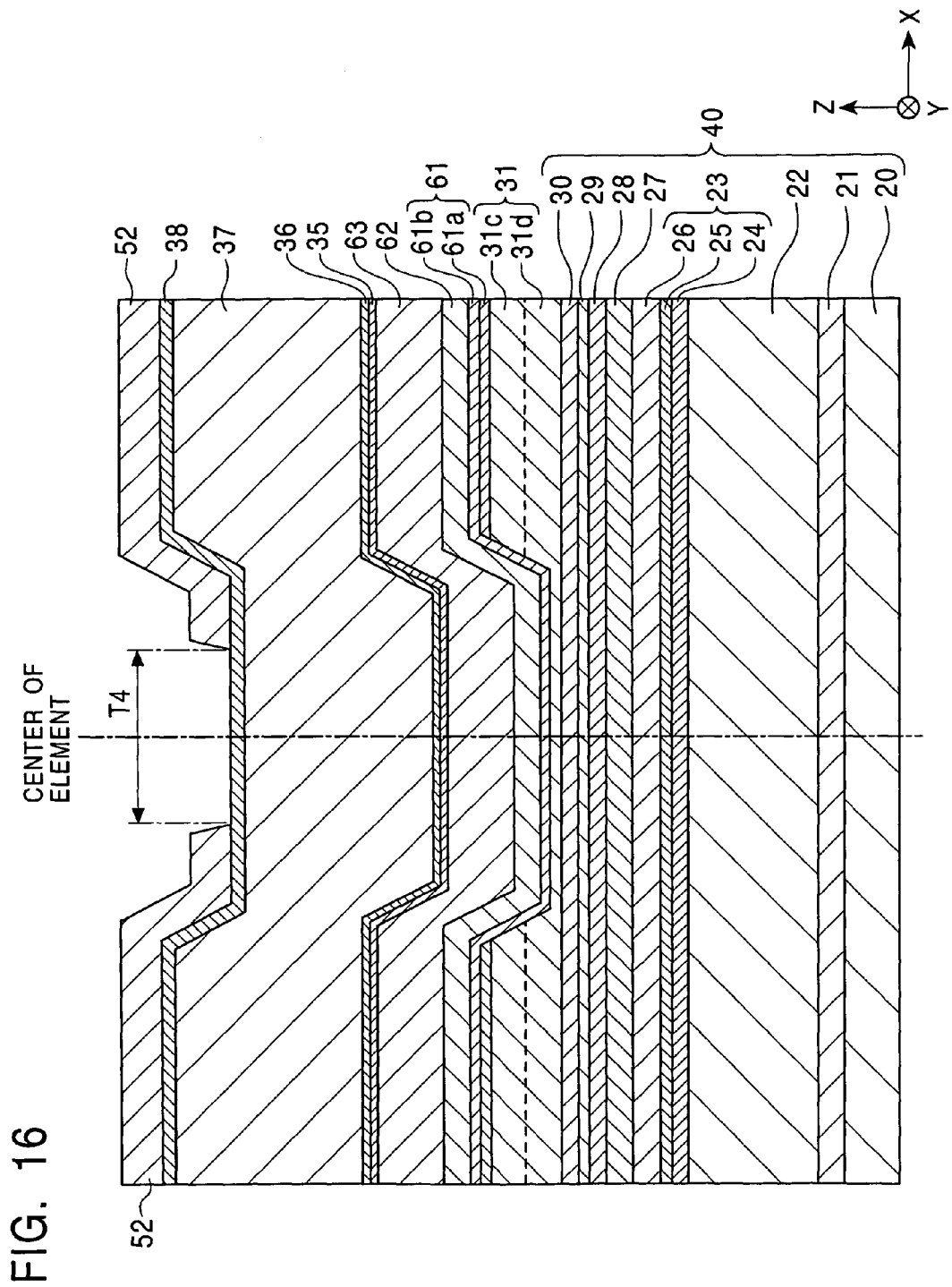
FIG. 16 is a representation of a step for manufacturing the magnetic detecting element shown in FIG. 4.

Then, in a step shown in FIG. 16, over the upper surface and internal side surfaces 61a1 of the Ta layer 61a, the internal side surfaces 31b and central potion 31a of the second antiferromagnetic layer 31 are deposited a base layer 61b, a second ferromagnetic layer 62 formed of a soft magnetic material, a third antiferromagnetic layer 63, a second stopper layer 35, and a second protective layer 36. Then, an electrode layer 37 is formed on the second protective layer 36, and is subsequently covered with a third protective layer 38.

The second ferromagnetic layer 62 is formed of CoPt, NiFe, or the like. The third antiferromagnetic layer 63 is formed of the same antiferromagnetic material of the first and second antiferromagnetic layers 22 and 31. The second protective layer 36 may not be provided unless diffusion of elements, as in the step of FIG. 10, occurs between the second stopper layer 35 and the electrode layer 37.

In the step of FIG. 16, as above, the end surface in the height direction (Y direction) of the electrode layer 37 can be jutted out over the end in the height direction of the laminate including the substrate 20 to the second antiferromagnetic layer 31. Thus, the resistance of the element can be reduced and the resulting magnetic detecting element can produce a large reproduction output.

Then, mask layers 52 are formed on the third protective layer 38, with a predetermined distance T4 in the track width direction (X direction). In this instance, the center in the track width direction of the space with a distance T4 between the mask layers 52 is aligned with the center in the track width direction of the element. The mask layers 52 are formed of Cr as in the step of FIG. 11. Preferably, the thickness of the mask layers 52 is in the range of 100 to 500 Å.

Then, a third annealing in a magnetic field is performed. In this instance, the direction of the magnetic field is in the track width direction (X direction). In the third magnetic field annealing, the intensity of the applied magnetic field is set lower than that of the exchange anisotropic magnetic fields of the first antiferromagnetic layer 22 and the second antiferromagnetic layer 31, and temperature of heat treatment is set lower than the blocking temperatures of the first antiferromagnetic layer 22 and the second antiferromagnetic layer 31. Thus, the exchange anisotropic magnetic field of the third antiferromagnetic layer 63 can be oriented in the track width direction (X direction) with the directions of the exchange anisotropic magnetic fields of the first antiferromagnetic layer 22 and the second antiferromagnetic layer 31 maintained, even though the third antiferromagnetic layer 63 is formed of an above-described PtMn or PtMnX alloy, as with the first antiferromagnetic layer 22 and the second antiferromagnetic layer 31. This third heat treatment is performed at, for example, 250° C., and the intensity of the magnetic field is set at 24 kA/m.

The third magnetic field annealing allows the third antiferromagnetic layer 63 to order-transform suitably and, thus, an exchange coupling magnetic field with a suitable intensity occurs between the third antiferromagnetic layer 63 and the second ferromagnetic layer 62.

The magnetic moments per area of the free magnetic layer 28 and the first ferromagnetic layer 30 are arbitrarily set, as long as the third magnetic field annealing is performed.

If the magnetic moment per area of the free magnetic layer 28 is larger than that of the first ferromagnetic layer 30, the second magnetic field annealing performed in the step of FIG. 6 may be omitted. In this instance, the second ferromagnetic layer 62 and the third antiferromagnetic layer 63 are deposited without generating an exchange coupling magnetic field between the first ferromagnetic layer 30 and the second antiferromagnetic layer 31, and annealing in a magnetic field is performed only once under the same conditions as in the second magnetic field annealing.

For example, the free magnetic layer 28 and the first ferromagnetic layer 30 are formed of the same soft magnetic material, and the thickness t1 of the free magnetic layer 28 is set to be larger than the thickness t2 of the first ferromagnetic layer 30.

Then, annealing is performed in a magnetic field in the track width direction with an intensity lower than that of the exchange anisotropic magnetic field of the first antiferromagnetic layer 22 and lower than the spin flop magnetic field of the free magnetic layer 28 and the first ferromagnetic layer 30 at a temperature lower than the blocking temperature of the first antiferromagnetic layer 22. For example, this temperature is set at 250° C., and the intensity of the magnetic field is set at 24 kA/m.

Thus, the exchange anisotropic magnetic field between the second antiferromagnetic layer 31 and the first ferromagnetic layer 30 can be oriented antiparallel to the track width direction (X direction), and the exchange anisotropic magnetic fields of the third antiferromagnetic layer 63 and the second ferromagnetic layer 62 can be oriented in the track width direction with the exchange anisotropic magnetic field of the first antiferromagnetic layer 22 maintained in the height direction (Y direction), even though the first antiferromagnetic layer 22, the second antiferromagnetic layer 31, and the third antiferromagnetic layer 63 are formed of the same material, such as above-described PtMn or a PtMnX alloy.

Consequently, the magnetization of the free magnetic layer 28 is fixed in the track width direction (X direction). On the other hand, the magnetization of the first ferromagnetic layer 30 is fixed antiparallel to the magnetization direction of the free magnetic layer 28 (antiparallel to the track width direction or X direction) by RKKY interaction between the first ferromagnetic layer 30 and the free magnetic layer 28.

At the same time, an exchange coupling magnetic field with a suitable intensity occurs between the third antiferromagnetic layer 63 and the second ferromagnetic layer 62, thereby fixing the magnetization of the second ferromagnetic layer 32 in the track width direction.

Thus, the magnetizations of the first ferromagnetic layer 30 and the second ferromagnetic layer 62 are fixed antiparallel to each other only by performing magnetic field annealing only once.

Figure 17:
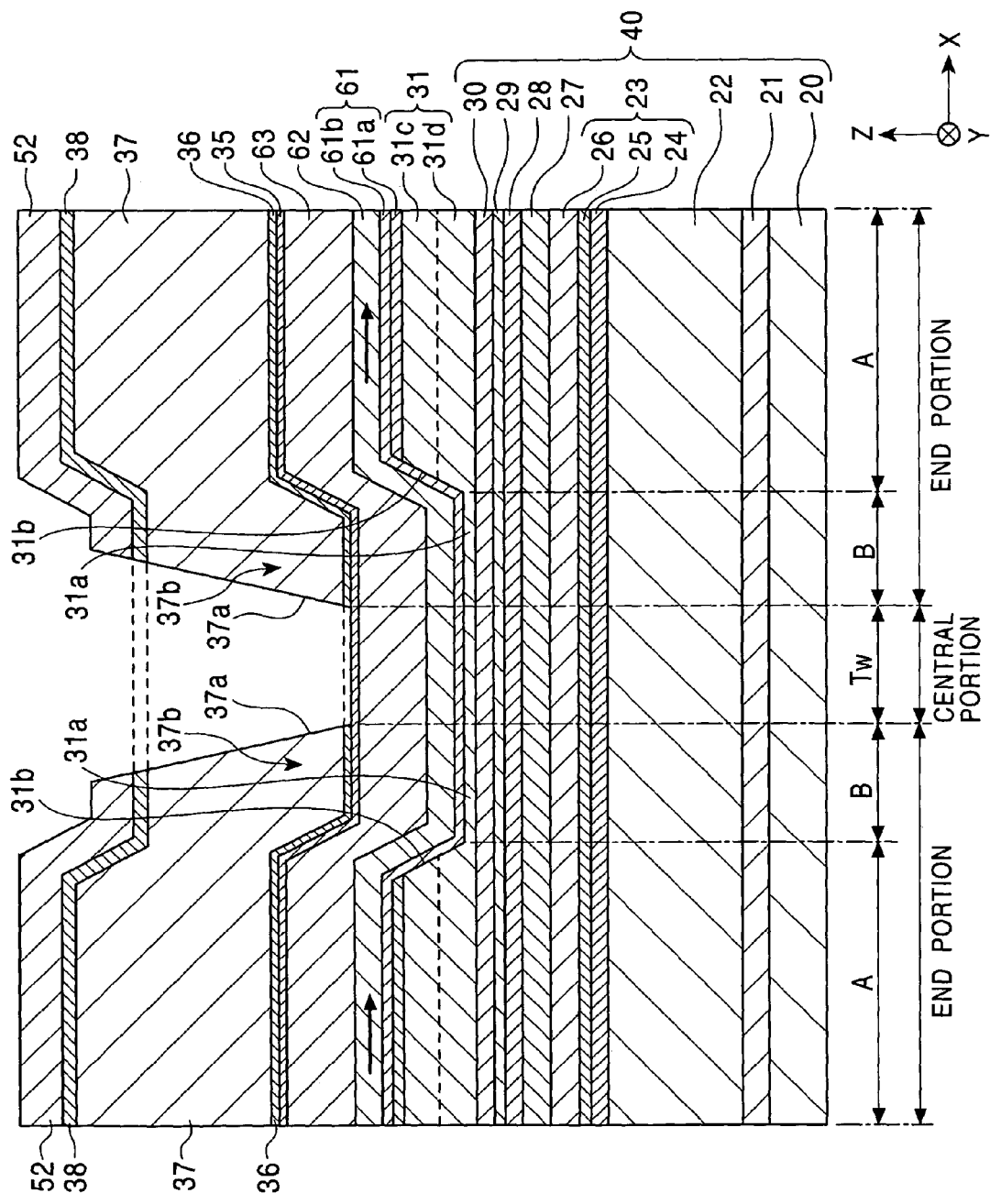
FIG. 17 is a representation of a step following the step shown in FIG. 15.

Turning to FIG. 17, the portions not covered with the mask layers 52 of the third protective layer 38 and electrode layer 37 (designated by dotted lines in the figure) are etched to be removed. Preferably, RIE is applied to this step. The etching gas may be $CF_4$, $C_3F_8$, or a mixture of Ar and $CF_4$ or $C_3F_8$ and Ar.

By removing the portions designated by dotted lines of the third protective layer 38, electrode layer 37, and second protective layer 36 are removed, the surface of the second stopper layer 35 is exposed.

Then, the second stopper layer 35 exposed between the mask layers 52, and the third antiferromagnetic layer 63, the second ferromagnetic layer 62, and the base layer 61b are removed by ion milling. Furthermore, ion milling is continued until the remaining second antiferromagnetic layer 31a and the first ferromagnetic layer 30 are entirely removed. This removal quantity of ion milling can be controlled using an SIMS analyzer. In particular, ion milling here can be performed at a low energy.

Although the nonmagnetic interlayer 29 underlying the first ferromagnetic layer 30 is maintained as it is, it may be partially removed, or entirely removed to expose the surface of the free magnetic layer 28. Also, in the ion milling step, the portion of the first ferromagnetic layer 30 exposed between the mask layers 52 is entirely removed, but it may be allowed to remain partially. The mask layers 52 are entirely removed by the ion milling.

After ion milling, while the central portion of the element does not have the first ferromagnetic layer 30 on the free magnetic layer 28, artificial ferrimagnetic structures are constituted of the free magnetic layer 28 and the first ferromagnetic layer 30 with the nonmagnetic interlayer 29 therebetween in regions B of the end portions. The artificial ferrimagnetic structures in regions B have essentially no second antiferromagnetic layer 31 on the first ferromagnetic layer. In regions A of the end portions of the element, ferrimagnetic structures are constituted of the free magnetic layer 28 and the first ferromagnetic layer 30 with the nonmagnetic interlayer 29 therebetween, and which have the second antiferromagnetic layer 31 with a large thickness on the first ferromagnetic layer 30.

In the ion milling step, the first ferromagnetic layer 30 and the second ferromagnetic layer 62 are each divided into two layers to form continuous, flush internal side surfaces 30a and 62a of the first ferromagnetic layers and second ferromagnetic layers 60. Hence, the second ferromagnetic layers 62 lie over the second antiferromagnetic layers 31 and the portions in regions B of the first antiferromagnetic layers 30, and, thus, the distance between the internal side surfaces 60a of the second ferromagnetic layers 60 and the internal side surfaces 30a of the first ferromagnetic layers 30 decreases.

Consequently, the magnetostatic coupling between the first ferromagnetic layers 30 and the second ferromagnetic layers 62 is strengthened, thereby making it hard that the static magnetic field enters the central portion of the free magnetic layer 28. As a result, the central portion of the free magnetic layer 28 certainly maintains the single magnetic domain state thereof to further reduce the hysteresis and suppress the occurrence of Barkhausen noises.

Furthermore, the fourth protective layer 39 is formed over the third protective layers 38, the internal side surfaces 37a of the electrode layers 37, and the exposed nonmagnetic interlayer 29. Thus, the magnetic detecting element shown in FIG. 4 is completed. The fourth protective layer 39 may be allowed to serve as a specular layer, as described above.

In the step of FIG. 6, the nonmagnetic layer 61, the second ferromagnetic layer 62, and the third antiferromagnetic layer 63 may be deposited all over the second antiferromagnetic layer 31. The central portions of the third antiferromagnetic layer 63, the second ferromagnetic layer 62, and the second antiferromagnetic layer 31 are removed as in the step of FIG. 9 and, then, the electrode layer 37 is formed. Such a process can provide a magnetic detecting element in which the second ferromagnetic layers 62 formed of a soft magnetic material overlie only the portions having a large thickness of the second antiferromagnetic layer 31 in regions A, which exhibit antiferromagnetic characteristics.

In the embodiments shown in FIGS. 1 and 3, the portion 31a of the second antiferromagnetic layer 31 is left in the central portion of the element in the step of FIG. 9. This portion 31a of the second antiferromagnetic layer 31 protects the first antiferromagnetic layer 30 thereunder from the ion milling in the step of FIG. 9. Also, the portion 31a with a small thickness of the second antiferromagnetic layer 31 is eventually left on the portions in regions B of the first ferromagnetic layers 30, which jut out under the internal side surfaces 31b of the second antiferromagnetic layers 31, toward the center in the track width direction of the element, and serve as the internal end portions 31a.

The CPP magnetic detecting element shown in FIG. 2 is manufactured through the same steps as those of FIGS. 5 to 16, except that the electrode layer is replaced with the insulating layer formed of $Al_2O_3$, $SiO_2$, or the like. Also, the substrate of the CPP magnetic detecting element is used as the lower electrode layer and the fourth protective layer 39 is replaced with the upper electrode layer.

The resulting magnetic detecting element of the present invention is used in the magnetic head contained in a hard disk, or for a magnetic sensor.

EXAMPLES

The magnetic detecting elements shown in FIGS. 1 and 3 were prepared, and their hysteresis, Barkhausen noise, output, and asymmetry were examined.

Also, a magnetic detecting element of comparative example was prepared whose layered structure were: silicon substrate/alumina (1000 Å)/seed layer 21, $(Ni_{0.8}Fe_{0.2})_{60}Cr_{40}$ (60 Å)/first antiferromagnetic layer 22, $Pt_{50}Mn_{50}$, (120 Å)/pinned magnetic layer 23, $Co_{90}Fe_{10}$ (16 Å)/Ru (9 Å)/$Co_{90}Fe_{10}$, (22 Å)/nonmagnetic material layer 27, Cu (21 Å)/free magnetic layer 28, $Co_{90}Fe_{10}$ (10 Å)/$Ni_{80}Fe_{20}$ (30 Å)/$Co_{90}Fe_{10}$ (6 Å)/nonmagnetic interlayer 29, Ru (9 Å)/first ferromagnetic layer 30, $Co_{90}Fe_{10}$ (18 Å))/second antiferromagnetic layer, $Pt_{50}Mn_{50}$ (200 Å)/Ta.

The layered structure of the magnetic detecting element shown in FIG. 1 were: silicon substrate/alumina (1000 Å)/seed layer 21, $(Ni_{0.8}Fe_{0.2})_{60}Cr_{40}$ (60 Å)/first antiferromagnetic layer 22, $Pt_{50}Mn_{50}$ (120 Å)/pinned magnetic layer 23, $Co_{90}Fe_{10}$ (16 Å)/Ru (9 Å)/$Co_{90}Fe_{10}$, (22 Å)/nonmagnetic material layer 27, Cu (21 Å)/free magnetic layer 28, $Co_{90}Fe_{10}$ (10 Å)/$Ni_{80}Fe_{20}$ (30 Å)/$Co_{90}Fe_{10}$ (6 Å)/nonmagnetic interlayer 29, Ru (9 Å)/first ferromagnetic layer 30, $Co_{90}Fe_{10}$ (18 Å))/second antiferromagnetic layer, $Pt_{50}Mn_{50}$ (200 Å)/second ferromagnetic layer 32, $Co_{90}Fe_{10}$ (X Å)/Ta.

The layered structure of the magnetic detecting element shown in FIG. 3 were: silicon substrate/alumina (1000 Å)/seed layer 21, $(Ni_{0.8}Fe_{0.2})_{60}Cr_{40}$ (60 Å)/first antiferromagnetic layer 22, $Pt_{50}Mn_{50}$ (120 Å)/pinned magnetic layer 23, $Co_{90}Fe_{10}$ (16 Å)/Ru (9 Å)/$Co_{90}Fe_{10}$ (22 Å)/nonmagnetic material layer 27, Cu (21 Å)/free magnetic layer 28, $Co_{90}Fe_{10}$ (10 Å)/$Ni_{80}Fe_{20}$ (30 Å)/$Co_{90}Fe_{10}$ (6 Å)/nonmagnetic interlayer 29, Ru (9 Å)/first ferromagnetic layer 30, $Co_{90}Fe_{10}$ (18 Å)/second antiferromagnetic layer, $Pt_{50}Mn_{50}$ (200 Å)/Ta layer 61a, Ta (10 Å)/base layer 61b, Cr (30 Å)/second ferromagnetic layer 60, CoPt (X Å)/Ta.

Figure 18:
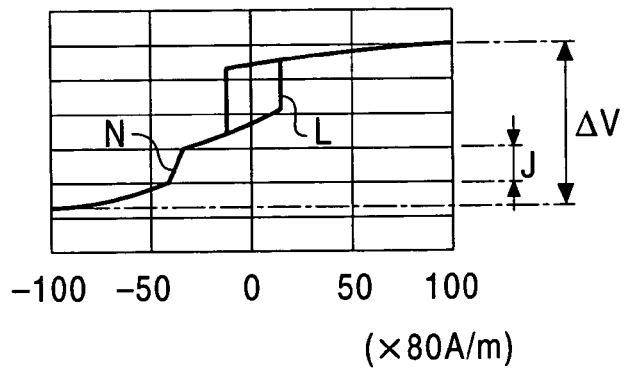
FIG. 18 is a plot of an R-H curve of a known magnetic detecting element.

FIG. 18 shows the R-H curve of the comparative example. The comparative example has the structure of a magnetic detecting element described in the related art. Specifically, while artificial ferrimagnetic structures are constituted of the free magnetic layer and the first ferromagnetic layer with the nonmagnetic interlayer therebetween, under the second antiferromagnetic layer in the end portions of the element, the second ferromagnetic layer does not provided on the second antiferromagnetic layer. R-H curves are graphs in which intensities of applied magnetic fields H are plotted in ordinate and output voltages V of a magnetic detecting element in abscissa. The output voltage V of a magnetic detecting element varies according to changes in resistance of the element.

The resistances of the magnetic detecting elements were measured while an magnetic field H varied from −8 to 8 kA/m was applied to the magnetic elements in the height direction (Y direction).

FIG. 18 shows a hysteresis loop L in the magnetic field range of −1 to 1 kA/m. Also, a Barkhausen noise occurs at a magnetic field H of about −3 kA/m.

Figure 19:
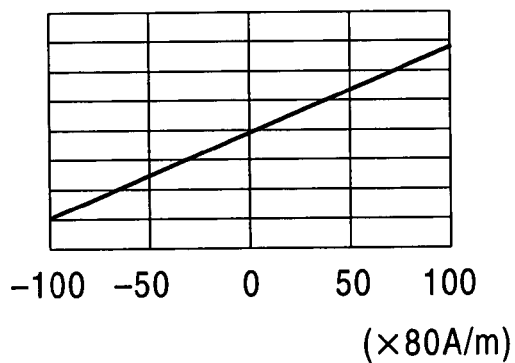
FIG. 19 is a plot of an R-H curve of the magnetic detecting element shown in FIG. 1.
Figure 20:
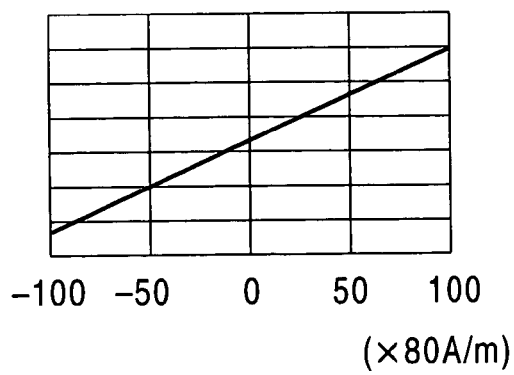
FIG. 20 is a plot of an R-H curve of the magnetic detecting element shown in FIG. 3.

FIG. 19 shows the R-H curve of the magnetic detecting element according to the first embodiment, shown in FIG. 1. The thickness of the CoFe second ferromagnetic layer 32 was 50 Å. FIG. 20 shows the R-H curve of the magnetic detecting element shown in FIG. 3. The thickness of the CoPt second ferromagnetic layer 60 was 50 Å.

As shown in FIGS. 19 and 20, essentially no hysteresis loop nor Barkhausen noise occurs.

The results indicate that by providing the second ferromagnetic layer on the second antiferromagnetic layer, an magnetostatic coupling can be generated between the first ferromagnetic layer and the second ferromagnetic layer, thereby reducing the probability of the entrance of a static magnetic field occurring from the internal side surfaces of the first ferromagnetic layer into the central portion of the free magnetic layer. Since the central portion of the free magnetic layer certainly maintains the single magnetic domain state thereof, the hysteresis can be reduced and the occurrence of Barkhausen noises can be suppressed.

The hysteresis, Barkhausen noise, and reproduction output, and asymmetry of the magnetic detecting element shown in FIG. 1 were examined while the thickness of the second ferromagnetic layer 32 was varied.

The hysteresis is evaluated with a percentage obtained by dividing the area of the hysteresis loop by the area defined by the line formed with the R-H curve and the centerline of the loop, the line parallel to the horizontal axis and drawn through the lower end point of the curve, and the line parallel to the vertical axis and drawn through the upper end point of the curve.

Magnitude of the Barkhausen nose is expressed on a percentage basis by the formula $(J/\Delta V) \times 100$, wherein $\Delta V$ represents the variation in voltage with an applied magnetic field varied from −8 to 8 kA/cm, and J represents the variation in voltage by Barkhausen noise.

Asymmetry is an index of symmetry of the reproduction waveform of output from a magnetic detecting element, and expressed in a percent basis by the formula $(V_+ - V_-/V_+ + V_-) \times 100$, wherein $V_+$ represents the variation in voltage with an applied magnetic field H varied from 0 to 8 kA/m, and $V_{31}$ represents the variation in voltage with an applied magnetic field H varied from 0 to −8 kA/m. A magnetic detecting element exhibiting an asymmetry value closer to 0% advantageously produces outputs with a more symmetrical waveform.

FIGS. 21, 22, 23, and 24 show the results as to the hysteresis, the Barkhausen noise, and the reproduction output, and the asymmetry, respectively.

Figure 21:
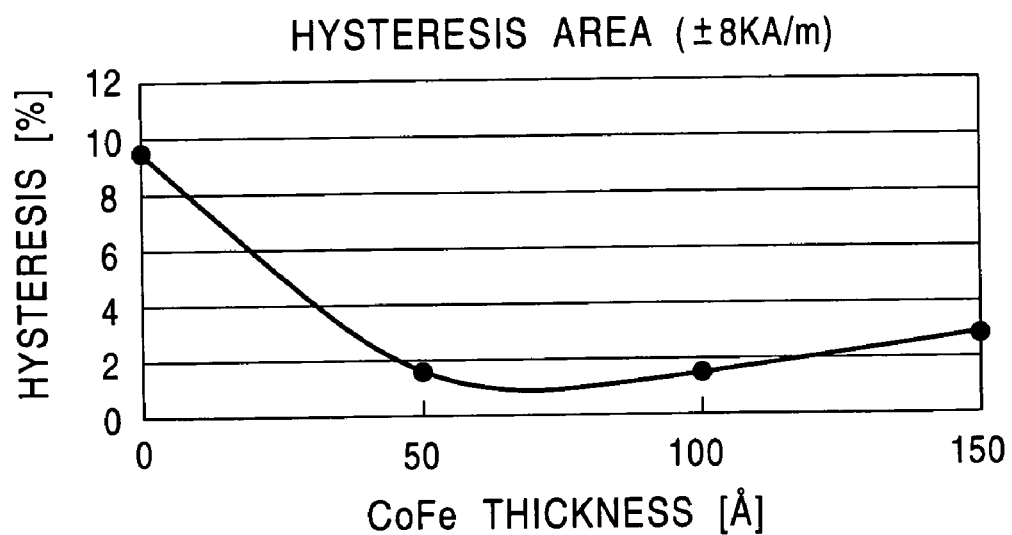
FIG. 21 is a plot of the relationship between the thickness of a second ferromagnetic layer and the hysteresis of the magnetic detecting element shown in FIG. 1.

FIG. 21 shows that as the thickness of the soft magnetic CoFe second ferromagnetic layer 32 on the second antiferromagnetic layer 31 increases, the hysteresis decreases and reaches a minimum value at a thickness of about 75 Å.

Figure 22:
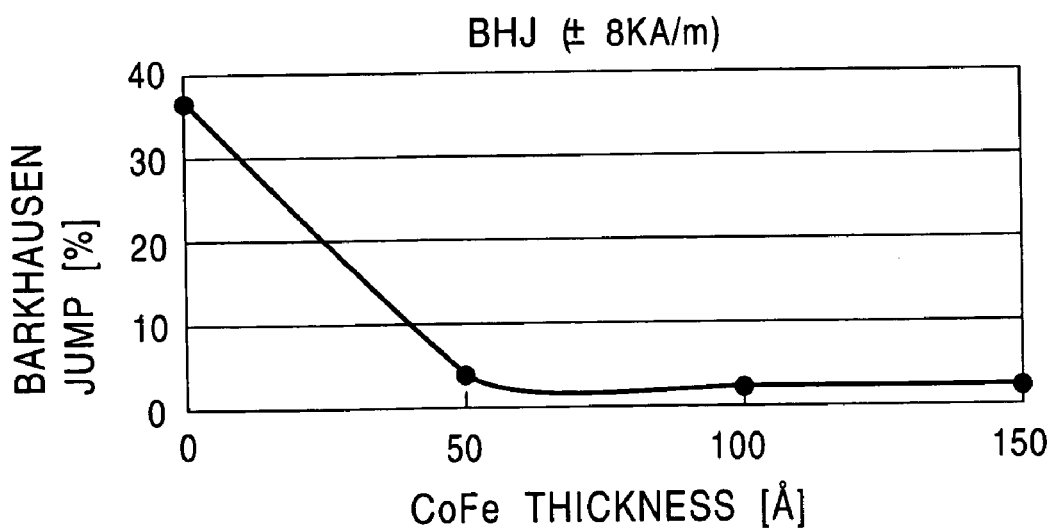
FIG. 22 is a plot of the relationship between the thickness of the second ferromagnetic layer and the Barkhausen noise of the magnetic detecting element shown in FIG. 1.

FIG. 22 shows that as the thickness of the second ferromagnetic layer 32 increases, the Barkhausen noise decreases and reaches a minimum value at a thickness of about 75 Å, as with the hysteresis.

Hence, as the thickness of the second ferromagnetic layer 32 increases, the magnetostatic coupling between the first ferromagnetic layer 30 and the second ferromagnetic layer 32 is strengthened, so that the probability of entrance of a static magnetic field into the central portion of the free magnetic layer can be reduced.

The hysteresis slightly increases at thicknesses of more than 75 Å. This is probably because a larger thickness of the second ferromagnetic layer 32 reduces the exchange anisotropic magnetic field between the second antiferromagnetic layer 31 and the second ferromagnetic layer 32 to weaken the force for fixing the magnetization of the second ferromagnetic layer 32, and, consequently, the magnetization of the second ferromagnetic layer 32 is changed by an applied magnetic field.

Figure 23:
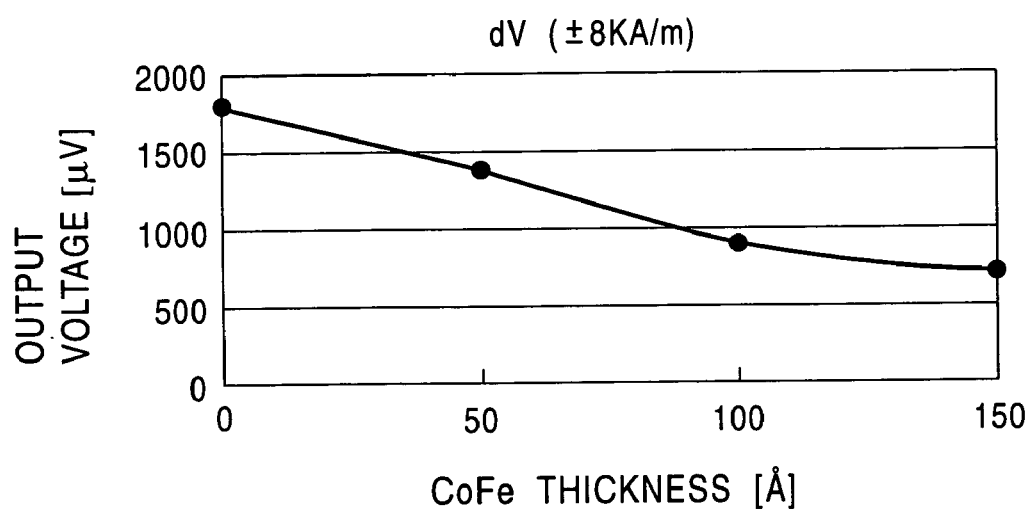
FIG. 23 is a plot of the relationship between the thickness of the second ferromagnetic layer and the output of the magnetic detecting element shown in FIG. 1.

FIG. 23 shows that a larger thickness of the second ferromagnetic layer 32 reduces the output (difference between the maximum voltage and the minimum voltage) of the magnetic detecting element. This indicates that the second ferromagnetic layer 32 suppresses not only disorder of the magnetic domain of the free magnetic layer 28 to stabilize its single-magnetic-domain formation, but also changes of the magnetization of the free magnetic layer 28. However, an output of 1000 μV or more suffices for practical use. Accordingly, FIGS. 21 to 23 suggest that the resulting magnetic detecting element can produce a practicable output by setting the thickness of the second ferromagnetic layer 32 so as to minimizing the hysteresis and the Barkhausen noise.

Figure 24:
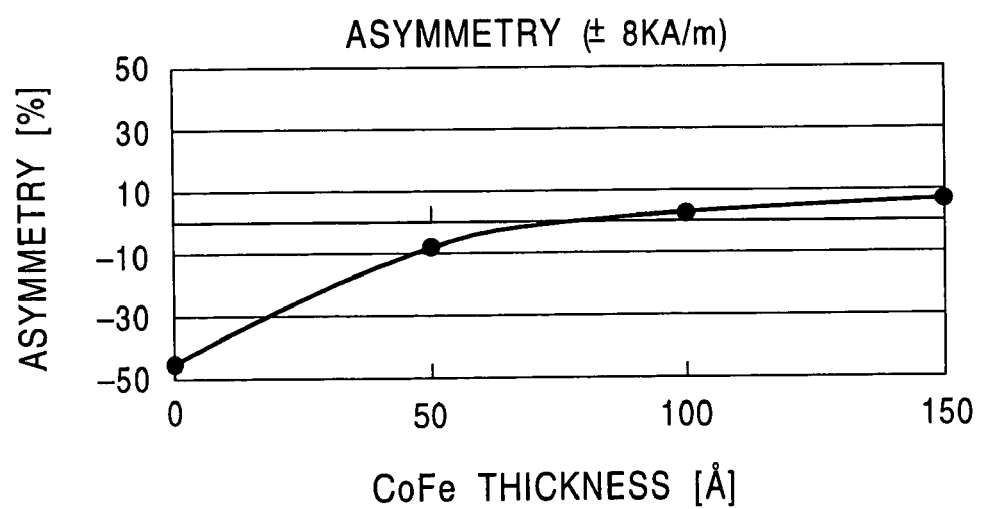
FIG. 24 is a plot of the relationship between the thickness of the second ferromagnetic layer and the asymmetry of the magnetic detecting element shown in FIG. 1.

FIG. 24 shows that by increasing the thickness of the second ferromagnetic layer 32 to reduce the hysteresis and the Barkhausen noise, the asymmetry value is also reduced.

According to the results of the example, by setting the thickness of the second ferromagnetic layer 32 in the range of 20 to 90 Å, the hysteresis and the Barkhausen noise can be reduced to half or less with the output voltage maintained to be 1000 $\mu$V or more.

However, the output, the hysteresis, and the Barkhausen noise depend on not only the thickness of the second ferromagnetic layer 32, but also the thickness t4 of the second antiferromagnetic layer 31 in the end portions of the element, the horizontal distance L1 between the internal side surfaces 30a of the first ferromagnetic layer 30 and the internal side surfaces 32a of the second ferromagnetic layer 32, the magnetic moment per area Mst of the first ferromagnetic layer 30, and the saturation magnetization Ms of the second ferromagnetic layer 32.

The example herein are intended to show that any magnetic detecting element having the structure of the present invention can exhibit a reduced hysteresis and Barkhausen noise with the output thereof maintained to be a practicable level. Therefore, it does not limit the scope of the invention as defined in and by the appended claims.

In the example for the results shown in FIGS. 21 to 24, the thickness t4 of the second antiferromagnetic layer 31 in the end portions of the element was set at 200 Å, the horizontal distance L1 between the internal side surfaces 30a of the first ferromagnetic layer 30 and the internal side surfaces 32a of the second ferromagnetic layer 32 at 0.1 $\mu$m, the magnetic moment per area Mst of the first ferromagnetic layer 30 at 3 T·nm, the saturation magnetization Ms of the second ferromagnetic layer 32 at 1.8 T, and the optical track width Tw at 0.12 $\mu$m.

Figure 25:
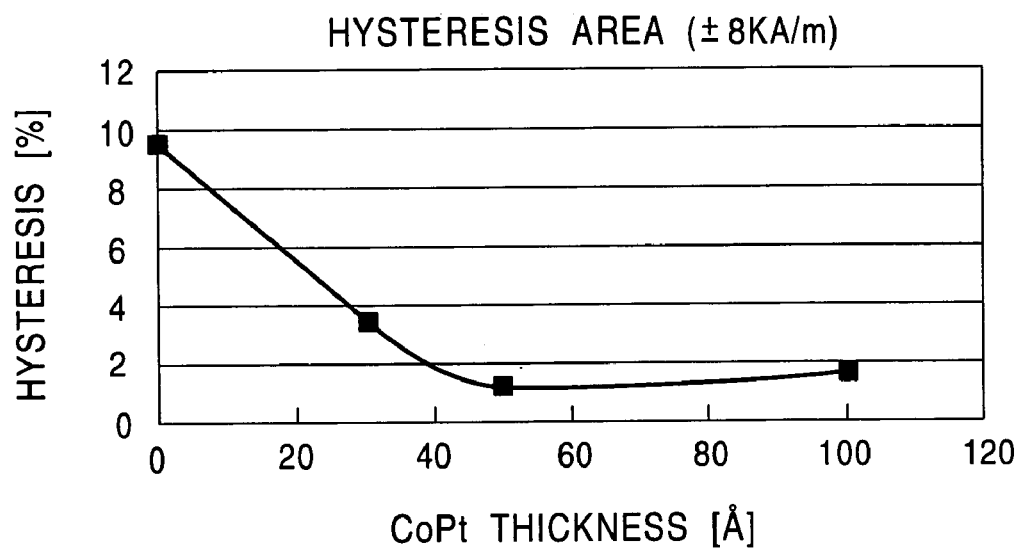
FIG. 25 is a plot of the relationship between the thickness of a second ferromagnetic layer and the hysteresis of the magnetic detecting element shown in FIG. 3.
Figure 26:
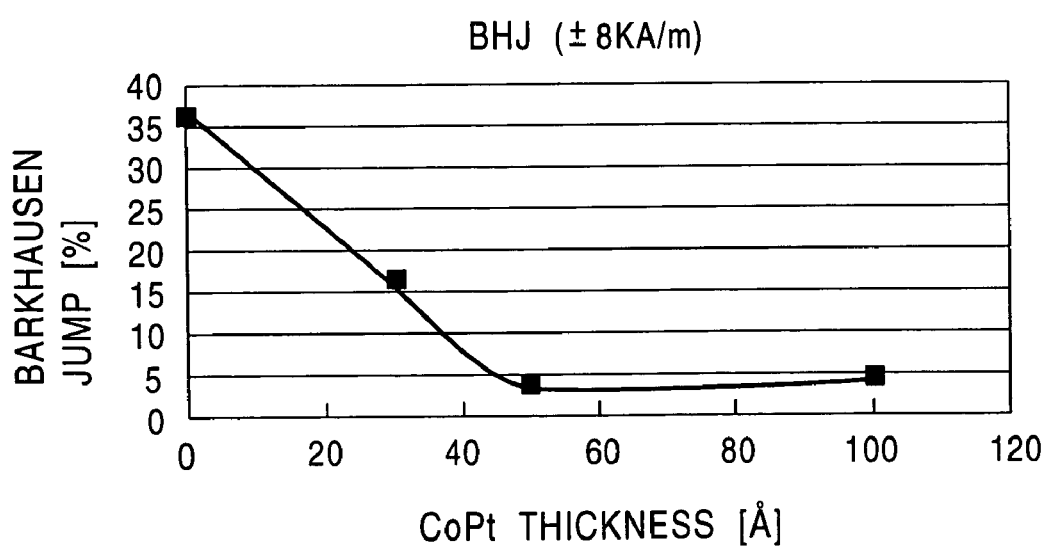
FIG. 26 is a plot of the relationship between the thickness of the second ferromagnetic layer and the Barkhausen noise of the magnetic detecting element shown in FIG. 3.

FIGS. 25 and 26 show the results of the examination for the hysteresis, Barkhausen noise, and output voltage of the magnetic detecting element shown in FIG. 3 with the thickness X of the second ferromagnetic layer 60 varied.

FIG. 25 shows that as the thickness of the hard magnetic CoPt second ferromagnetic layer 60 on the second antiferromagnetic layer 31 increases, the hysteresis decreases and reaches a minimum value at a thickness of about 50 Å.

FIG. 26 shows that as the thickness of the second ferromagnetic layer 60 increases, the Barkhausen noise decreases and reaches a minimum value at a thickness of about 50 Å, as with the hysteresis.

Hence, as the thickness of the second ferromagnetic layer 60 formed of a hard magnetic material increases, the magnetostatic coupling between the first ferromagnetic layer 30 and the second ferromagnetic layer 60 is strengthened, so that the probability of entrance of a static magnetic field generated from the internal side surfaces 30a of the first ferromagnetic layer 30 into the central portion of the free magnetic layer 28 can be reduced.

Figure 27:
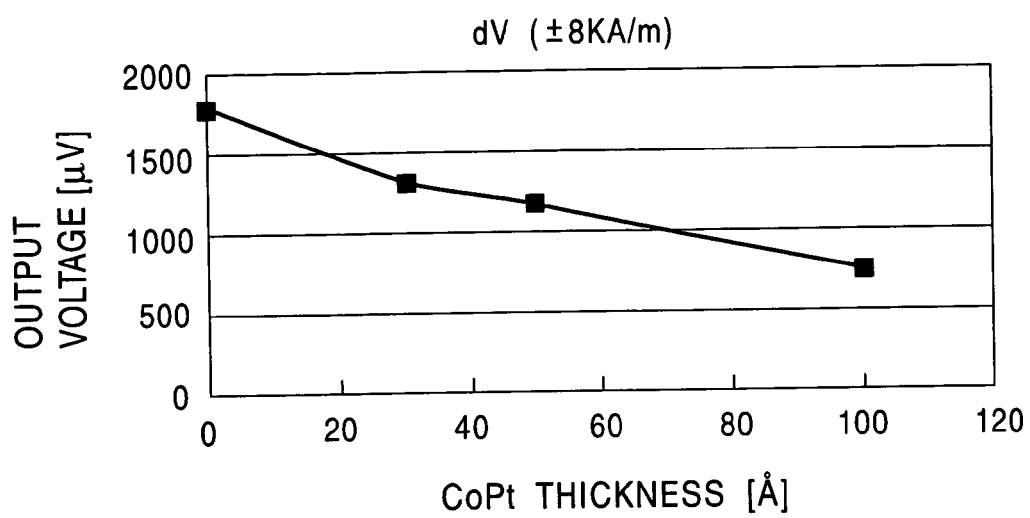
FIG. 27 is a plot of the relationship between the thickness of the second ferromagnetic layer and the output of the magnetic detecting element shown in FIG. 3.

FIG. 27 shows that a larger thickness of the second ferromagnetic layer 60 reduces the output (difference between the maximum voltage and the minimum voltage) of the magnetic detecting element. This indicates that the second ferromagnetic layer 60 suppresses not only disorder of the magnetic domain of the free magnetic layer 28 to stabilize its single-magnetic-domain formation, but also changes of the magnetization of the free magnetic layer 28. However, an output of 1000 $\mu$V or more suffices for practical use. Accordingly, FIGS. 25 and 26 suggest that the resulting magnetic detecting element can produce a practicable output by setting the thickness of the second ferromagnetic layer 60 so as to minimizing the hysteresis and the Barkhausen noise.

Figure 28:
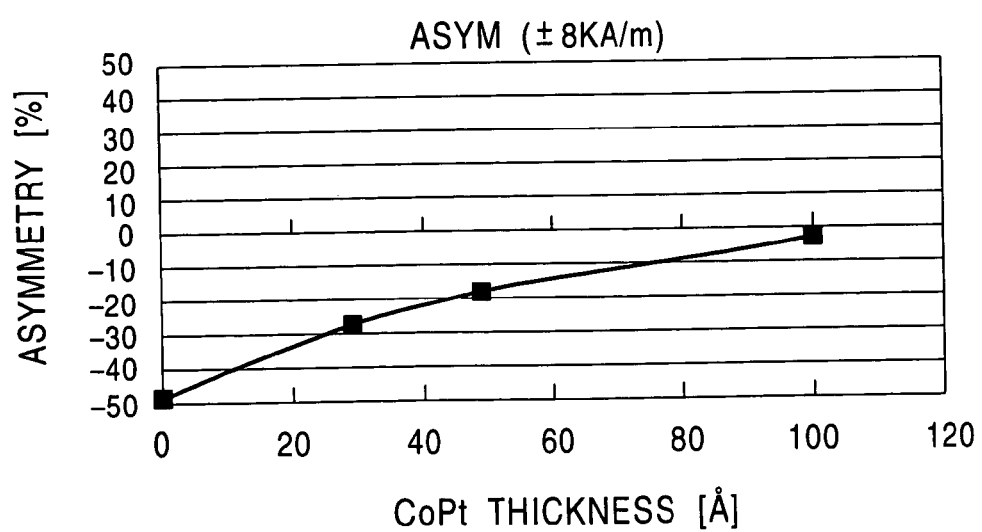
FIG. 28 is a plot of the relationship between the thickness of the second ferromagnetic layer and the asymmetry of the magnetic detecting element shown in FIG. 3.
Figure 29:
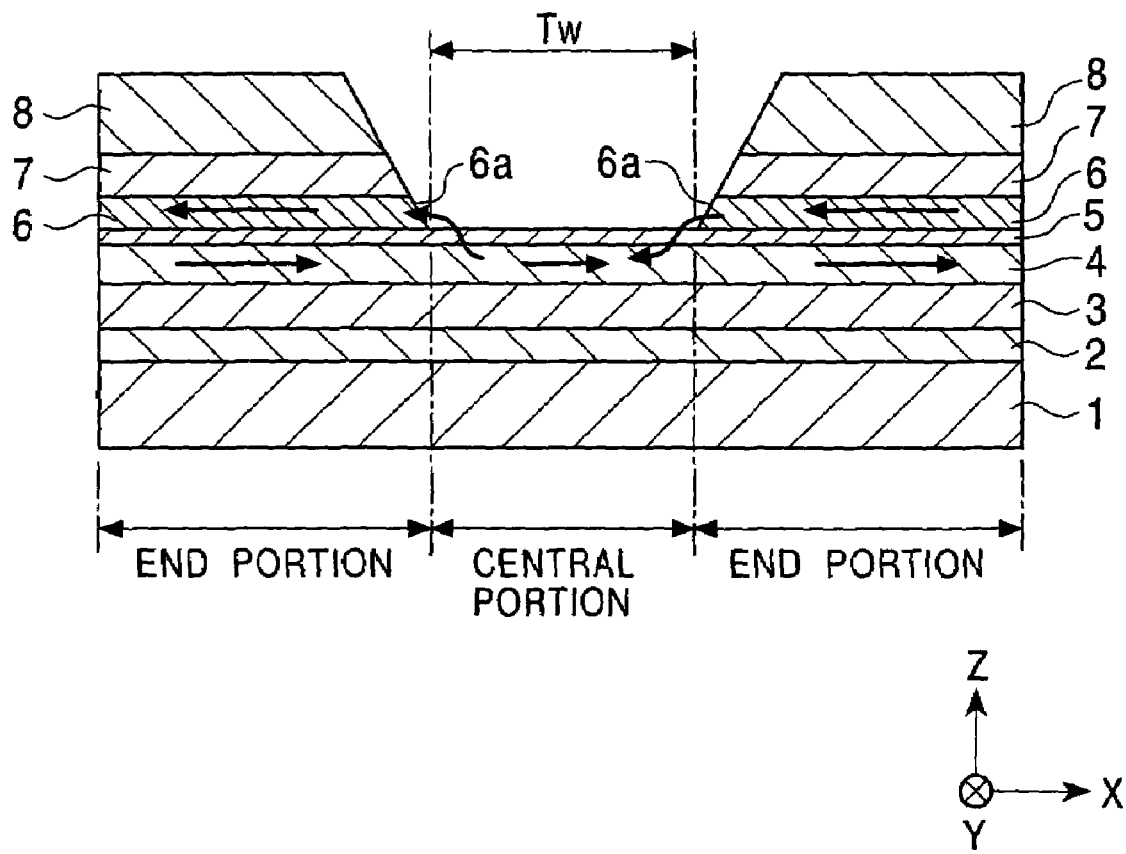
FIG. 29 is a fragmentary sectional view of a known magnetic detecting element, viewed from a side opposing a recording medium.

FIG. 28 shows that by increasing the thickness of the second ferromagnetic layer 60 to reduce the hysteresis and the Barkhausen noise, the asymmetry value is also reduced.

According to the results of the example, by setting the thickness of the second ferromagnetic layer 60 in the range of 30 to 60 Å, the hysteresis and the Barkhausen noise can be reduced to half or less with the output voltage maintained to be 1000 $\mu$V or more.

However, the output, the hysteresis, and Barkhausen noise of the magnetic detecting element depend on not only the thickness of the second ferromagnetic layer 60, but also the vertical distance t6 between the internal side surfaces 30a of the first ferromagnetic layer 30 and the internal side surfaces 60a of the second ferromagnetic layer 60, the magnetic moment per area Mst of the first ferromagnetic layer 30, and the residual magnetization Mr of the second ferromagnetic layer 60.

The example is intended to show that any magnetic detecting element having the structure of the present invention can exhibit a reduced hysteresis and Barkhausen noise with the output thereof maintained to be a practicable level. Therefore, it does not limit the scope of the invention as defined in and by the appended claims.

In the example for the results shown in FIGS. 25 to 28, the vertical distance t6 between the internal side surfaces 30a of the first ferromagnetic layer 30 and the internal side surfaces 60a of the second ferromagnetic layer 60 was set at 60 Å, the magnetic moment per area Mst of the first ferromagnetic layer 30 at 3 T·nm, the residual magnetization Mr of the second ferromagnetic layer 60 at 1 T, and the optical track width Tw at 0.12 $\mu$m.

What is claimed is:

1. A magnetic detecting element comprising:
    a multilayer laminate including a first antiferromagnetic layer, a pinned magnetic layer, a nonmagnetic material layer, and a free magnetic layer deposited in that order from below;
    a nonmagnetic interlayer disposed above the free magnetic layer;
    a pair of first ferromagnetic layers disposed above the nonmagnetic interlayer in end portions in a track width direction of the magnetic detecting element, the first ferromagnetic layers being separated in the track width direction by a space therebetween;
    a pair of second antiferromagnetic layers separately disposed above the respective first ferromagnetic layers;
    a pair of second ferromagnetic layers separately disposed above the respective second antiferromagnetic layers; and
    electrode layers,
    wherein the pair of antiferromagnetic layers have an internal end portion starting at the space between the first ferromagnetic layers and extending outward in a track width direction, the internal end portion having a substantially constant thickness for a non-zero length prior to a gradual increase in thickness at an outer end portion of the second antiferromagnetic layer such that at least two distinct points on the same side of the space have the same thickness in the internal end portion, and
    wherein a magnetization direction of the second ferromagnetic layers is antiparallel to that of the first ferromagnetic layers.

2. A magnetic detecting element according to claim 1, wherein the pair of electrode layers lies over the internal end portions of second antiferromagnetic layers.

3. A magnetic detecting element according to claim 2, wherein the second ferromagnetic layers lie over the internal end portions and the outer end portions of the second antiferromagnetic layers.

4. A magnetic detecting element according to claim 2, wherein the second ferromagnetic layers overlie only the outer end portions of the second antiferromagnetic layers.

5. A magnetic detecting element according to claim 1, the second ferromagnetic layers comprise a soft magnetic material and are deposited directly on upper surfaces of the second antiferromagnetic layers.

6. A magnetic detecting element according to claim 5, wherein a magnetic moment per area of the free magnetic layer is larger than that of the first ferromagnetic layers.

7. A magnetic detecting element according to claim 1, further comprising nonmagnetic layers between the respective second antiferromagnetic layers and the second ferromagnetic layers, wherein the second ferromagnetic layers comprise a hard magnetic material.

8. A magnetic detecting element according to claim 7, wherein a magnetic moment per area of the free magnetic layer is larger than that of the first ferromagnetic layers.

9. A magnetic detecting element according to claim 7, wherein a magnetic moment per area of the free magnetic layer is smaller than that of the first ferromagnetic layers.

10. A magnetic detecting element according to claim 1, further comprising nonmagnetic layers between the respective second antiferromagnetic layers and the second ferromagnetic layers, and third antiferromagnetic layers on respective upper surfaces of the second ferromagnetic layers, wherein the second ferromagnetic layers comprise a soft magnetic material.

11. A magnetic detecting element according to claim 10, wherein the first antiferromagnetic layers, the second antiferromagnetic layers, and the third antiferromagnetic layers comprise the same material.

12. A magnetic detecting element according to claim 10, wherein the third antiferromagnetic layers comprise a material having a blocking temperature lower than that of the materials of the first antiferromagnetic layers and the second antiferromagnetic layers.

13. A magnetic detecting element according to claim 1, wherein the electrode layers lie above and under the multilayer laminate.

14. A magnetic detecting element comprising:
a multilayer laminate including a first antiferromagnetic layer, a pinned magnetic layer, a nonmagnetic material layer, and a free magnetic layer deposited in that order from below;
a nonmagnetic interlayer disposed above the free magnetic layer;
a pair of first ferromagnetic layers disposed above the nonmagnetic interlayer in end portions in a track width direction of the magnetic detecting element, the first ferromagnetic layers being separated in the track width direction by a space therebetween;
a pair of second antiferromagnetic layers separately disposed above the respective first ferromagnetic layers;
a pair of second ferromagnetic layers separately disposed above the respective second antiferromagnetic layers;
electrode layers; and
nonmagnetic layers disposed between the respective second antiferromagnetic layers and the second ferromagnetic layers, and third antiferromagnetic layers on respective upper surfaces of the second ferromagnetic layers,
wherein a magnetization direction of the second ferromagnetic layers is antiparallel to that of the first ferromagnetic layers,
the second ferromagnetic layers comprise a soft magnetic material, and
the first antiferromagnetic layers, the second antiferromagnetic layers, and the third antiferromagnetic layers comprise the same material.

15. A magnetic detecting element comprising:
a multilayer laminate including a first antiferromagnetic layer, a pinned magnetic layer, a nonmagnetic material layer, and a free magnetic layer deposited in that order from below;
a nonmagnetic interlayer disposed above the free magnetic layer;
a pair of first ferromagnetic layers disposed above the nonmagnetic interlayer in end portions in a track width direction of the magnetic detecting element, the first ferromagnetic layers being separated in the track width direction by a space therebetween;
a pair of second antiferromagnetic layers separately disposed above the respective first ferromagnetic layers;
a pair of second ferromagnetic layers separately disposed above the respective second antiferromagnetic layers;
electrode layers; and
nonmagnetic layers disposed between the respective second antiferromagnetic layers and the second ferromagnetic layers, and third antiferromagnetic layers on respective upper surfaces of the second ferromagnetic layers,
wherein a magnetization direction of the second ferromagnetic layers is antiparallel to that of the first ferromagnetic layers,
the second ferromagnetic layers comprise a soft magnetic material, and
the third antiferromagnetic layers comprise a material having a blocking temperature lower than that of the materials of the first antiferromagnetic layers and the second antiferromagnetic layers.

* * * * *